US011438329B2

(12) United States Patent
Hart et al.

(10) Patent No.: US 11,438,329 B2
(45) Date of Patent: Sep. 6, 2022

(54) SYSTEMS AND METHODS FOR AUTHENTICATED PEER-TO-PEER DATA TRANSFER USING RESOURCE LOCATORS

(71) Applicant: Capital One Services, LLC, McLean, VA (US)

(72) Inventors: Colin Hart, Washington, DC (US); George Bergeron, Falls Church, VA (US); Kaitlin Newman, Washington, DC (US); Jeffrey Rule, Chevy Chase, MD (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 17/162,783

(22) Filed: Jan. 29, 2021

(65) Prior Publication Data
US 2022/0247737 A1    Aug. 4, 2022

(51) Int. Cl.
*H04L 29/06* (2006.01)
*H04L 9/40* (2022.01)
(Continued)

(52) U.S. Cl.
CPC ........ *H04L 63/0853* (2013.01); *G06F 16/955* (2019.01); *H04L 67/146* (2013.01); *H04W 4/80* (2018.02)

(58) Field of Classification Search
CPC .... H04L 63/0853; H04L 67/146; H04W 4/80; G06F 16/955
(Continued)

(56) References Cited

U.S. PATENT DOCUMENTS

| 4,683,553 A | 7/1987 | Mollier |
| 4,827,113 A | 5/1989 | Rikuna |

(Continued)

FOREIGN PATENT DOCUMENTS

| AU | 2015363218 | 6/2017 |
| AU | 2016296378 | 11/2017 |

(Continued)

OTHER PUBLICATIONS

Urien, "LLCPS: A New Security Framework Based On TLS For NFC P2P Applications In The Internet Of Things", 2013, IEEE, pp. 845-846 (Year: 2013).*

(Continued)

*Primary Examiner* — Taghi T Arani
*Assistant Examiner* — Gregory A Lane
(74) *Attorney, Agent, or Firm* — Hunton Andrews Kurth LLP

(57) ABSTRACT

An authenticated data transfer system may include generating, after entry of one or more processors of a transmitting device into a communication field, a link, the link comprising a near field communication data exchange format uniform resource locator including identifier data and user data; transmitting, to a first application comprising instructions for execution on a first device, the link to initiate data transfer; authenticating a user associated with the first device by activating one or more actions based on the link; transmitting one or more requests for confirmation of quantity and recipient data associated with the data transfer; receiving one or more notifications that are based on the one or more requests for confirmation of quantity and recipient data associated with the data transfer; and performing one or more login credentials that are responsive to the one or more notifications so as to complete the data transfer.

20 Claims, 6 Drawing Sheets

(51) Int. Cl.
*H04W 4/80* (2018.01)
*H04L 67/146* (2022.01)
*G06F 16/955* (2019.01)

(58) Field of Classification Search
USPC .......................................................... 726/17
See application file for complete search history.

(56) References Cited

U.S. PATENT DOCUMENTS

| | | | |
|---|---|---|---|
| 4,910,773 A | 3/1990 | Hazard et al. | |
| 5,036,461 A | 7/1991 | Elliott et al. | |
| 5,363,448 A | 11/1994 | Koopman, Jr. et al. | |
| 5,377,270 A | 12/1994 | Koopman, Jr. et al. | |
| 5,533,126 A | 7/1996 | Hazard | |
| 5,537,314 A | 7/1996 | Kanter | |
| 5,592,553 A | 1/1997 | Guski et al. | |
| 5,616,901 A | 4/1997 | Crandall | |
| 5,666,415 A | 9/1997 | Kaufman | |
| 5,764,789 A | 6/1998 | Pare, Jr. et al. | |
| 5,768,373 A | 6/1998 | Lohstroh et al. | |
| 5,778,072 A | 7/1998 | Samar | |
| 5,796,827 A | 8/1998 | Coppersmith et al. | |
| 5,832,090 A | 11/1998 | Raspotnik | |
| 5,883,810 A | 3/1999 | Franklin et al. | |
| 5,901,874 A | 5/1999 | Deters | |
| 5,929,413 A | 7/1999 | Gardner | |
| 5,960,411 A | 9/1999 | Hartman et al. | |
| 6,021,203 A | 2/2000 | Douceur et al. | |
| 6,049,328 A | 4/2000 | Vanderheiden | |
| 6,058,373 A | 5/2000 | Blinn et al. | |
| 6,061,666 A | 5/2000 | Do et al. | |
| 6,105,013 A | 8/2000 | Curry et al. | |
| 6,199,114 B1 | 3/2001 | White et al. | |
| 6,199,762 B1 | 3/2001 | Hohle | |
| 6,216,227 B1 | 4/2001 | Goldstein et al. | |
| 6,227,447 B1 | 5/2001 | Campisano | |
| 6,282,522 B1 | 8/2001 | Davis et al. | |
| 6,324,271 B1 | 11/2001 | Sawyer et al. | |
| 6,342,844 B1 | 1/2002 | Rozin | |
| 6,367,011 B1 | 4/2002 | Lee et al. | |
| 6,402,028 B1 | 6/2002 | Graham, Jr. et al. | |
| 6,438,550 B1 | 8/2002 | Doyle et al. | |
| 6,501,847 B2 | 12/2002 | Helot et al. | |
| 6,631,197 B1 | 10/2003 | Taenzer | |
| 6,641,050 B2 | 11/2003 | Kelley et al. | |
| 6,655,585 B2 | 12/2003 | Shinn | |
| 6,662,020 B1 | 12/2003 | Aaro et al. | |
| 6,721,706 B1 | 4/2004 | Strubbe et al. | |
| 6,731,778 B1 | 5/2004 | Oda et al. | |
| 6,779,115 B1 | 8/2004 | Naim | |
| 6,792,533 B2 | 9/2004 | Jablon | |
| 6,829,711 B1 | 12/2004 | Kwok et al. | |
| 6,834,271 B1 | 12/2004 | Hodgson et al. | |
| 6,834,795 B1 | 12/2004 | Rasmussen et al. | |
| 6,852,031 B1 | 2/2005 | Rowe | |
| 6,865,547 B1 | 3/2005 | Brake, Jr. et al. | |
| 6,873,260 B2 | 3/2005 | Lancos et al. | |
| 6,877,656 B1 | 4/2005 | Jaros et al. | |
| 6,889,198 B2 | 5/2005 | Kawan | |
| 6,905,411 B2 | 6/2005 | Nguyen et al. | |
| 6,910,627 B1 | 6/2005 | Simpson-Young et al. | |
| 6,971,031 B2 | 11/2005 | Haala | |
| 6,990,588 B1 | 1/2006 | Yasukura | |
| 7,006,986 B1 | 2/2006 | Sines et al. | |
| 7,085,931 B1 | 8/2006 | Smith et al. | |
| 7,127,605 B1 | 10/2006 | Montgomery et al. | |
| 7,128,274 B2 | 10/2006 | Kelley et al. | |
| 7,140,550 B2 | 11/2006 | Ramachandran | |
| 7,152,045 B2 | 12/2006 | Hoffman | |
| 7,165,727 B2 | 1/2007 | de Jong | |
| 7,175,076 B1 | 2/2007 | Block et al. | |
| 7,202,773 B1 | 4/2007 | Oba et al. | |
| 7,206,806 B2 | 4/2007 | Pineau | |
| 7,232,073 B1 | 6/2007 | de Jong | |
| 7,246,752 B2 | 7/2007 | Brown | |
| 7,254,569 B2 | 8/2007 | Goodman et al. | |
| 7,263,507 B1 | 8/2007 | Brake, Jr. et al. | |
| 7,270,276 B2 | 9/2007 | Vayssiere | |
| 7,278,025 B2 | 10/2007 | Saito et al. | |
| 7,287,692 B1 | 10/2007 | Patel et al. | |
| 7,290,709 B2 | 11/2007 | Tsai et al. | |
| 7,306,143 B2 | 12/2007 | Bonneau, Jr. et al. | |
| 7,319,986 B2 | 1/2008 | Praisner et al. | |
| 7,325,132 B2 | 1/2008 | Takayama et al. | |
| 7,373,515 B2 | 5/2008 | Owen et al. | |
| 7,374,099 B2 | 5/2008 | de Jong | |
| 7,375,616 B2 | 5/2008 | Rowse et al. | |
| 7,380,710 B2 | 6/2008 | Brown | |
| 7,424,977 B2 | 9/2008 | Smets et al. | |
| 7,453,439 B1 | 11/2008 | Kushler et al. | |
| 7,472,829 B2 | 1/2009 | Brown | |
| 7,487,357 B2 | 2/2009 | Smith et al. | |
| 7,539,860 B2 | 5/2009 | Glazer et al. | |
| 7,568,631 B2 | 8/2009 | Gibbs et al. | |
| 7,584,153 B2 | 9/2009 | Brown et al. | |
| 7,597,250 B2 | 10/2009 | Finn | |
| 7,628,322 B2 | 12/2009 | Hohmanns et al. | |
| 7,652,578 B2 | 1/2010 | Braun et al. | |
| 7,689,832 B2 | 3/2010 | Talmor et al. | |
| 7,703,142 B1 | 4/2010 | Wilson et al. | |
| 7,748,609 B2 | 7/2010 | Sachdeva et al. | |
| 7,748,617 B2 | 7/2010 | Gray | |
| 7,748,636 B2 | 7/2010 | Finn | |
| 7,762,457 B2 | 7/2010 | Bonalle et al. | |
| 7,789,302 B2 | 9/2010 | Tame | |
| 7,793,851 B2 | 9/2010 | Mullen | |
| 7,796,013 B2 | 9/2010 | Murakami et al. | |
| 7,801,799 B1 | 9/2010 | Brake, Jr. et al. | |
| 7,801,829 B2 | 9/2010 | Gray et al. | |
| 7,805,755 B2 | 9/2010 | Brown et al. | |
| 7,809,643 B2 | 10/2010 | Phillips et al. | |
| 7,827,115 B2 | 11/2010 | Weller et al. | |
| 7,828,214 B2 | 11/2010 | Narendra et al. | |
| 7,848,746 B2 | 12/2010 | Juels | |
| 7,882,553 B2 | 2/2011 | Tuliani | |
| 7,900,048 B2 | 3/2011 | Andersson | |
| 7,908,216 B1 | 3/2011 | Davis et al. | |
| 7,922,082 B2 | 4/2011 | Muscato | |
| 7,933,589 B1 | 4/2011 | Mamdani et al. | |
| 7,949,559 B2 | 5/2011 | Freiberg | |
| 7,954,716 B2 | 6/2011 | Narendra et al. | |
| 7,954,723 B2 | 6/2011 | Charrat | |
| 7,962,369 B2 | 6/2011 | Rosenberg | |
| 7,984,512 B2 * | 7/2011 | Flaks .................. G06F 21/6218 726/28 |
| 7,993,197 B2 | 8/2011 | Mamdani et al. | |
| 8,005,426 B2 | 8/2011 | Huomo et al. | |
| 8,010,405 B1 | 8/2011 | Bortolin et al. | |
| RE42,762 E | 9/2011 | Shin | |
| 8,014,756 B1 | 9/2011 | Henderson | |
| 8,041,954 B2 | 10/2011 | Plesman | |
| 8,060,012 B2 | 11/2011 | Sklovsky et al. | |
| 8,074,877 B2 | 12/2011 | Mullen et al. | |
| 8,082,450 B2 | 12/2011 | Frey et al. | |
| 8,095,113 B2 | 1/2012 | Kean et al. | |
| 8,099,332 B2 | 1/2012 | Lemay et al. | |
| 8,103,249 B2 | 1/2012 | Markison | |
| 8,108,687 B2 | 1/2012 | Ellis et al. | |
| 8,127,143 B2 | 2/2012 | Abdallah et al. | |
| 8,135,648 B2 | 3/2012 | Oram et al. | |
| 8,140,010 B2 | 3/2012 | Symons et al. | |
| 8,141,136 B2 | 3/2012 | Lee et al. | |
| 8,150,321 B2 | 4/2012 | Winter et al. | |
| 8,150,767 B2 | 4/2012 | Wankmueller | |
| 8,186,602 B2 | 5/2012 | Itay et al. | |
| 8,196,131 B1 | 6/2012 | von Behren et al. | |
| 8,215,563 B2 | 7/2012 | Levy et al. | |
| 8,224,753 B2 | 7/2012 | Atef et al. | |
| 8,232,879 B2 | 7/2012 | Davis | |
| 8,233,841 B2 | 7/2012 | Griffin et al. | |
| 8,245,292 B2 | 8/2012 | Buer | |
| 8,249,654 B1 | 8/2012 | Zhu | |
| 8,266,451 B2 | 9/2012 | Leydier et al. | |
| 8,285,329 B1 | 10/2012 | Zhu | |

(56) References Cited

U.S. PATENT DOCUMENTS

| | | |
|---|---|---|
| 8,302,872 B2 | 11/2012 | Mullen |
| 8,312,519 B1 | 11/2012 | Bailey et al. |
| 8,316,237 B1 | 11/2012 | Felsher et al. |
| 8,332,272 B2 | 12/2012 | Fisher |
| 8,365,988 B1 | 2/2013 | Medina, III et al. |
| 8,369,960 B2 | 2/2013 | Tran et al. |
| 8,371,501 B1 | 2/2013 | Hopkins |
| 8,381,307 B2 | 2/2013 | Cimino |
| 8,391,719 B2 | 3/2013 | Alameh et al. |
| 8,417,231 B2 | 4/2013 | Sanding et al. |
| 8,439,271 B2 | 5/2013 | Smets et al. |
| 8,475,367 B1 | 7/2013 | Yuen et al. |
| 8,489,112 B2 | 7/2013 | Roeding et al. |
| 8,511,542 B2 | 8/2013 | Pan |
| 8,559,872 B2 | 10/2013 | Butler |
| 8,566,916 B1 | 10/2013 | Vernon et al. |
| 8,567,670 B2 | 10/2013 | Stanfield et al. |
| 8,572,386 B2 | 10/2013 | Takekawa et al. |
| 8,577,810 B1 | 11/2013 | Dalit et al. |
| 8,583,454 B2 | 11/2013 | Beraja et al. |
| 8,589,335 B2 | 11/2013 | Smith et al. |
| 8,594,730 B2 | 11/2013 | Bona et al. |
| 8,615,468 B2 | 12/2013 | Varadarajan |
| 8,620,218 B2 | 12/2013 | Awad |
| 8,667,285 B2 | 3/2014 | Coulier et al. |
| 8,723,941 B1 | 5/2014 | Shirbabadi et al. |
| 8,726,405 B1 | 5/2014 | Bailey et al. |
| 8,740,073 B2 | 6/2014 | Vijayshankar et al. |
| 8,750,514 B2 | 6/2014 | Gallo et al. |
| 8,752,189 B2 | 6/2014 | De Jong |
| 8,794,509 B2 | 8/2014 | Bishop et al. |
| 8,799,668 B2 | 8/2014 | Cheng |
| 8,806,592 B2 | 8/2014 | Ganesan |
| 8,807,440 B1 | 8/2014 | Von Behren et al. |
| 8,811,892 B2 | 8/2014 | Khan et al. |
| 8,814,039 B2 | 8/2014 | Bishop et al. |
| 8,814,052 B2 | 8/2014 | Bona et al. |
| 8,818,867 B2 | 8/2014 | Baldwin et al. |
| 8,850,538 B1 | 9/2014 | Vernon et al. |
| 8,861,733 B2 | 10/2014 | Benteo et al. |
| 8,880,027 B1 | 11/2014 | Darringer |
| 8,888,002 B2 | 11/2014 | Chesney et al. |
| 8,898,088 B2 | 11/2014 | Springer et al. |
| 8,934,837 B2 | 1/2015 | Zhu et al. |
| 8,977,569 B2 | 3/2015 | Rao |
| 8,994,498 B2 | 3/2015 | Agrafioti et al. |
| 9,004,365 B2 | 4/2015 | Bona et al. |
| 9,038,894 B2 | 5/2015 | Khalid |
| 9,042,814 B2 | 5/2015 | Royston et al. |
| 9,047,531 B2 | 6/2015 | Showering et al. |
| 9,069,976 B2 | 6/2015 | Toole et al. |
| 9,081,948 B2 | 7/2015 | Magne |
| 9,104,853 B2 | 8/2015 | Venkataramani et al. |
| 9,118,663 B1 | 8/2015 | Bailey et al. |
| 9,122,964 B2 | 9/2015 | Krawczewicz |
| 9,129,280 B2 | 9/2015 | Bona et al. |
| 9,152,832 B2 | 10/2015 | Royston et al. |
| 9,166,986 B1 | 10/2015 | Saylor et al. |
| 9,203,800 B2 | 12/2015 | Izu et al. |
| 9,209,867 B2 | 12/2015 | Royston |
| 9,251,330 B2 | 2/2016 | Boivie et al. |
| 9,251,518 B2 | 2/2016 | Levin et al. |
| 9,258,715 B2 | 2/2016 | Borghei |
| 9,270,337 B2 | 2/2016 | Zhu et al. |
| 9,306,626 B2 | 4/2016 | Hall et al. |
| 9,306,942 B1 | 4/2016 | Bailey et al. |
| 9,324,066 B2 | 4/2016 | Archer et al. |
| 9,324,067 B2 | 4/2016 | Van Os et al. |
| 9,332,587 B2 | 5/2016 | Salahshoor |
| 9,338,622 B2 | 5/2016 | Bjontegard |
| 9,373,141 B1 | 6/2016 | Shakkarwar |
| 9,379,841 B2 | 6/2016 | Fine et al. |
| 9,413,430 B2 | 8/2016 | Royston et al. |
| 9,413,768 B1 | 8/2016 | Gregg et al. |
| 9,420,496 B1 | 8/2016 | Indurkar |
| 9,426,132 B1 | 8/2016 | Alikhani |
| 9,432,339 B1 | 8/2016 | Bowness |
| 9,455,968 B1 | 9/2016 | Machani et al. |
| 9,473,509 B2 | 10/2016 | Arsanjani et al. |
| 9,477,517 B2 | 10/2016 | Naveh et al. |
| 9,491,626 B2 | 11/2016 | Sharma et al. |
| 9,553,637 B2 | 1/2017 | Yang et al. |
| 9,619,952 B1 | 4/2017 | Zhao et al. |
| 9,635,000 B1 | 4/2017 | Muftic |
| 9,665,858 B1 | 5/2017 | Kumar |
| 9,674,705 B2 | 6/2017 | Rose et al. |
| 9,679,286 B2 | 6/2017 | Colnot et al. |
| 9,680,942 B2 | 6/2017 | Dimmick |
| 9,710,804 B2 | 7/2017 | Zhou et al. |
| 9,740,342 B2 | 8/2017 | Paulsen et al. |
| 9,740,988 B1 | 8/2017 | Levin et al. |
| 9,763,097 B2 | 9/2017 | Robinson et al. |
| 9,767,329 B2 | 9/2017 | Forster |
| 9,769,662 B1 | 9/2017 | Queru |
| 9,773,151 B2 | 9/2017 | Mil'shtein et al. |
| 9,780,953 B2 | 10/2017 | Gaddam et al. |
| 9,891,823 B2 | 2/2018 | Feng et al. |
| 9,940,571 B1 | 4/2018 | Herrington |
| 9,953,323 B2 | 4/2018 | Candelore et al. |
| 9,961,194 B1 | 5/2018 | Wiechman et al. |
| 9,965,756 B2 | 5/2018 | Davis et al. |
| 9,965,911 B2 | 5/2018 | Wishne |
| 9,978,058 B2 | 5/2018 | Wurmfeld et al. |
| 10,043,164 B2 | 8/2018 | Dogin et al. |
| 10,075,437 B1 | 9/2018 | Costigan et al. |
| 10,129,648 B1 | 11/2018 | Hernandez et al. |
| 10,133,979 B1 | 11/2018 | Eidam et al. |
| 10,217,105 B1 | 2/2019 | Sangi et al. |
| 10,467,622 B1 | 11/2019 | Rule et al. |
| 2001/0010723 A1 | 8/2001 | Pinkas |
| 2001/0013020 A1 | 8/2001 | Yoshida et al. |
| 2001/0029485 A1 | 10/2001 | Brody et al. |
| 2001/0034702 A1 | 10/2001 | Mockett et al. |
| 2001/0054003 A1 | 12/2001 | Chien et al. |
| 2002/0078345 A1 | 6/2002 | Sandhu et al. |
| 2002/0093530 A1 | 7/2002 | Krothapalli et al. |
| 2002/0100808 A1 | 8/2002 | Norwood et al. |
| 2002/0120583 A1 | 8/2002 | Keresman, III et al. |
| 2002/0152116 A1 | 10/2002 | Yan et al. |
| 2002/0153424 A1 | 10/2002 | Li |
| 2002/0165827 A1 | 11/2002 | Gien et al. |
| 2003/0023554 A1 | 1/2003 | Yap et al. |
| 2003/0034873 A1 | 2/2003 | Chase et al. |
| 2003/0055727 A1 | 3/2003 | Walker et al. |
| 2003/0078882 A1 | 4/2003 | Sukeda et al. |
| 2003/0167350 A1 | 9/2003 | Davis et al. |
| 2003/0208449 A1 | 11/2003 | Diao |
| 2004/0015958 A1 | 1/2004 | Veil et al. |
| 2004/0039919 A1 | 2/2004 | Takayama et al. |
| 2004/0127256 A1 | 7/2004 | Goldthwaite et al. |
| 2004/0193676 A1* | 9/2004 | Marks .............. H04M 1/72412 709/203 |
| 2004/0215674 A1 | 10/2004 | Odinak et al. |
| 2004/0230799 A1 | 11/2004 | Davis |
| 2005/0044367 A1 | 2/2005 | Gasparini et al. |
| 2005/0075985 A1 | 4/2005 | Cartmell |
| 2005/0081038 A1 | 4/2005 | Arditti Modiano et al. |
| 2005/0138387 A1 | 6/2005 | Lam et al. |
| 2005/0156026 A1 | 7/2005 | Ghosh et al. |
| 2005/0160049 A1 | 7/2005 | Lundholm |
| 2005/0187882 A1 | 8/2005 | Sovio et al. |
| 2005/0195975 A1 | 9/2005 | Kawakita |
| 2005/0247797 A1 | 11/2005 | Ramachandran |
| 2006/0006230 A1 | 1/2006 | Bear et al. |
| 2006/0040726 A1 | 2/2006 | Szrek et al. |
| 2006/0041402 A1 | 2/2006 | Baker |
| 2006/0044153 A1 | 3/2006 | Dawidowsky |
| 2006/0047954 A1 | 3/2006 | Sachdeva et al. |
| 2006/0085848 A1 | 4/2006 | Aissi et al. |
| 2006/0136334 A1 | 6/2006 | Atkinson et al. |
| 2006/0173985 A1 | 8/2006 | Moore |
| 2006/0174331 A1 | 8/2006 | Schuetz |
| 2006/0242698 A1 | 10/2006 | Inskeep et al. |
| 2006/0280338 A1 | 12/2006 | Rabb |

(56) References Cited

U.S. PATENT DOCUMENTS

| | | |
|---|---|---|
| 2007/0033642 A1 | 2/2007 | Ganesan et al. |
| 2007/0055630 A1 | 3/2007 | Gauthier et al. |
| 2007/0061266 A1 | 3/2007 | Moore et al. |
| 2007/0061487 A1 | 3/2007 | Moore et al. |
| 2007/0116292 A1 | 5/2007 | Kurita et al. |
| 2007/0118745 A1 | 5/2007 | Buer |
| 2007/0197261 A1 | 8/2007 | Humbel |
| 2007/0224969 A1 | 9/2007 | Rao |
| 2007/0241182 A1 | 10/2007 | Buer |
| 2007/0256134 A1 | 11/2007 | Lehtonen et al. |
| 2007/0258594 A1 | 11/2007 | Sandhu et al. |
| 2007/0278291 A1 | 12/2007 | Rans et al. |
| 2008/0008315 A1 | 1/2008 | Fontana et al. |
| 2008/0011831 A1 | 1/2008 | Bonalle et al. |
| 2008/0014867 A1 | 1/2008 | Finn |
| 2008/0035738 A1 | 2/2008 | Mullen |
| 2008/0071681 A1 | 3/2008 | Khalid |
| 2008/0072303 A1 | 3/2008 | Syed |
| 2008/0086767 A1 | 4/2008 | Kulkarni et al. |
| 2008/0103968 A1 | 5/2008 | Bies et al. |
| 2008/0109309 A1 | 5/2008 | Landau et al. |
| 2008/0110983 A1 | 5/2008 | Ashfield |
| 2008/0120711 A1 | 5/2008 | Dispensa |
| 2008/0156873 A1 | 7/2008 | Wilhelm et al. |
| 2008/0162312 A1 | 7/2008 | Sklovsky et al. |
| 2008/0164308 A1 | 7/2008 | Aaron et al. |
| 2008/0207307 A1 | 8/2008 | Cunningham, II et al. |
| 2008/0209543 A1 | 8/2008 | Aaron |
| 2008/0223918 A1 | 9/2008 | Williams et al. |
| 2008/0285746 A1 | 11/2008 | Landrock et al. |
| 2008/0308641 A1 | 12/2008 | Finn |
| 2009/0037275 A1 | 2/2009 | Pollio |
| 2009/0048026 A1 | 2/2009 | French |
| 2009/0132417 A1 | 5/2009 | Scipioni et al. |
| 2009/0140839 A1 | 6/2009 | Bishop et al. |
| 2009/0143104 A1 | 6/2009 | Loh et al. |
| 2009/0165098 A1 | 6/2009 | Ifrah |
| 2009/0171682 A1 | 7/2009 | Dixon et al. |
| 2009/0182663 A1 | 7/2009 | Hurst |
| 2009/0210308 A1 | 8/2009 | Toomer et al. |
| 2009/0235339 A1 | 9/2009 | Mennes et al. |
| 2009/0249077 A1 | 10/2009 | Gargaro et al. |
| 2009/0282264 A1 | 11/2009 | Amiel et al. |
| 2010/0023449 A1 | 1/2010 | Skowronek et al. |
| 2010/0023455 A1 | 1/2010 | Dispensa et al. |
| 2010/0029202 A1 | 2/2010 | Jolivet et al. |
| 2010/0033310 A1 | 2/2010 | Narendra et al. |
| 2010/0036769 A1 | 2/2010 | Winters et al. |
| 2010/0078471 A1 | 4/2010 | Lin et al. |
| 2010/0082491 A1 | 4/2010 | Rosenblatt et al. |
| 2010/0094754 A1 | 4/2010 | Bertran et al. |
| 2010/0095130 A1 | 4/2010 | Bertran et al. |
| 2010/0100480 A1 | 4/2010 | Altman et al. |
| 2010/0114731 A1 | 5/2010 | Kingston et al. |
| 2010/0192230 A1 | 7/2010 | Steeves et al. |
| 2010/0207742 A1 | 8/2010 | Buhot et al. |
| 2010/0211797 A1 | 8/2010 | Westerveld et al. |
| 2010/0240413 A1 | 9/2010 | He et al. |
| 2010/0257357 A1 | 10/2010 | McClain |
| 2010/0262494 A1 | 10/2010 | Marshall |
| 2010/0274634 A1 | 10/2010 | Ifrah |
| 2010/0312634 A1 | 12/2010 | Cervenka |
| 2010/0312635 A1 | 12/2010 | Cervenka |
| 2011/0028160 A1 | 2/2011 | Roeding et al. |
| 2011/0035604 A1 | 2/2011 | Habraken |
| 2011/0060631 A1 | 3/2011 | Grossman et al. |
| 2011/0068170 A1 | 3/2011 | Lehman |
| 2011/0084132 A1 | 4/2011 | Tofighbakhsh |
| 2011/0101093 A1 | 5/2011 | Ehrensvard |
| 2011/0113245 A1 | 5/2011 | Varadrajan |
| 2011/0125638 A1 | 5/2011 | Davis et al. |
| 2011/0131415 A1 | 6/2011 | Schneider |
| 2011/0153437 A1 | 6/2011 | Archer et al. |
| 2011/0153496 A1 | 6/2011 | Royyuru |
| 2011/0208658 A1 | 8/2011 | Makhotin |
| 2011/0208965 A1 | 8/2011 | Machani |
| 2011/0211219 A1 | 9/2011 | Bradley |
| 2011/0218911 A1 | 9/2011 | Spodak |
| 2011/0238564 A1 | 9/2011 | Lim et al. |
| 2011/0239282 A1 | 9/2011 | Svarfvar et al. |
| 2011/0246780 A1 | 10/2011 | Yeap et al. |
| 2011/0258452 A1 | 10/2011 | Coulier et al. |
| 2011/0270751 A1 | 11/2011 | Csinger et al. |
| 2011/0276511 A1 | 11/2011 | Rosenberg |
| 2011/0280406 A1 | 11/2011 | Ma et al. |
| 2011/0282785 A1 | 11/2011 | Chin |
| 2011/0288993 A1 | 11/2011 | Bonalle et al. |
| 2011/0294418 A1 | 12/2011 | Chen |
| 2011/0312271 A1 | 12/2011 | Ma et al. |
| 2012/0024947 A1 | 2/2012 | Naelon |
| 2012/0030047 A1 | 2/2012 | Fuentes et al. |
| 2012/0030121 A1 | 2/2012 | Grellier |
| 2012/0047071 A1 | 2/2012 | Mullen et al. |
| 2012/0066034 A1 | 3/2012 | Nolan |
| 2012/0079281 A1 | 3/2012 | Lowenstein et al. |
| 2012/0109735 A1 | 5/2012 | Krawczewicz et al. |
| 2012/0109764 A1 | 5/2012 | Martin et al. |
| 2012/0143754 A1 | 6/2012 | Patel |
| 2012/0150737 A1 | 6/2012 | Rottink |
| 2012/0166314 A1 | 6/2012 | Kimberg |
| 2012/0178366 A1 | 7/2012 | Levy et al. |
| 2012/0196583 A1 | 8/2012 | Kindo |
| 2012/0207305 A1 | 8/2012 | Gallo et al. |
| 2012/0209773 A1 | 8/2012 | Ranganathan |
| 2012/0238206 A1 | 9/2012 | Singh et al. |
| 2012/0239560 A1 | 9/2012 | Pourfallah et al. |
| 2012/0252350 A1 | 10/2012 | Steinmetz et al. |
| 2012/0254394 A1 | 10/2012 | Barras |
| 2012/0284194 A1 | 11/2012 | Liu et al. |
| 2012/0290472 A1 | 11/2012 | Mullen et al. |
| 2012/0296818 A1 | 11/2012 | Nuzzi et al. |
| 2012/0316992 A1 | 12/2012 | Oborne |
| 2012/0317035 A1 | 12/2012 | Royyuru et al. |
| 2012/0317628 A1 | 12/2012 | Yeager |
| 2013/0005245 A1 | 1/2013 | Royston |
| 2013/0008956 A1 | 1/2013 | Ashfield |
| 2013/0026229 A1 | 1/2013 | Jarman et al. |
| 2013/0048713 A1 | 2/2013 | Pan |
| 2013/0054474 A1 | 2/2013 | Yeager |
| 2013/0065564 A1 | 3/2013 | Conner et al. |
| 2013/0080228 A1 | 3/2013 | Fisher |
| 2013/0080229 A1 | 3/2013 | Fisher |
| 2013/0099587 A1 | 4/2013 | Lou |
| 2013/0104251 A1 | 4/2013 | Moore et al. |
| 2013/0106576 A1 | 5/2013 | Hinman et al. |
| 2013/0119130 A1 | 5/2013 | Braams |
| 2013/0130614 A1 | 5/2013 | Busch-Sorensen |
| 2013/0144793 A1 | 6/2013 | Royston |
| 2013/0171929 A1 | 7/2013 | Adams et al. |
| 2013/0179351 A1 | 7/2013 | Wallner |
| 2013/0185772 A1 | 7/2013 | Jaudon et al. |
| 2013/0191279 A1 | 7/2013 | Calman et al. |
| 2013/0200999 A1 | 8/2013 | Spodak et al. |
| 2013/0216108 A1 | 8/2013 | Hwang et al. |
| 2013/0226791 A1 | 8/2013 | Springer et al. |
| 2013/0226796 A1 | 8/2013 | Jiang et al. |
| 2013/0232082 A1 | 9/2013 | Krawczewicz et al. |
| 2013/0237155 A1* | 9/2013 | Kim ..................... H04W 76/10 455/41.2 |
| 2013/0238894 A1 | 9/2013 | Ferg et al. |
| 2013/0282360 A1 | 10/2013 | Shimota et al. |
| 2013/0303085 A1 | 11/2013 | Boucher et al. |
| 2013/0304651 A1 | 11/2013 | Smith |
| 2013/0312082 A1 | 11/2013 | Izu et al. |
| 2013/0314593 A1 | 11/2013 | Reznik et al. |
| 2013/0344857 A1 | 12/2013 | Berionne et al. |
| 2014/0002238 A1 | 1/2014 | Taveau et al. |
| 2014/0019352 A1 | 1/2014 | Shrivastava |
| 2014/0027506 A1 | 1/2014 | Heo et al. |
| 2014/0032409 A1 | 1/2014 | Rosano |
| 2014/0032410 A1 | 1/2014 | Georgiev et al. |
| 2014/0040120 A1 | 2/2014 | Cho et al. |
| 2014/0040139 A1 | 2/2014 | Brudnicki et al. |
| 2014/0040147 A1 | 2/2014 | Varadarakan et al. |

(56) References Cited

U.S. PATENT DOCUMENTS

| | | |
|---|---|---|
| 2014/0047235 A1 | 2/2014 | Lessiak et al. |
| 2014/0067690 A1 | 3/2014 | Pitroda et al. |
| 2014/0074637 A1 | 3/2014 | Hammad |
| 2014/0074655 A1 | 3/2014 | Lim et al. |
| 2014/0081720 A1 | 3/2014 | Wu |
| 2014/0138435 A1 | 5/2014 | Khalid |
| 2014/0171034 A1 | 6/2014 | Aleksin et al. |
| 2014/0171039 A1 | 6/2014 | Bjontegard |
| 2014/0172700 A1 | 6/2014 | Teuwen et al. |
| 2014/0180851 A1 | 6/2014 | Fisher |
| 2014/0208112 A1 | 7/2014 | McDonald et al. |
| 2014/0214674 A1 | 7/2014 | Narula |
| 2014/0229375 A1 | 8/2014 | Zaytzsev et al. |
| 2014/0245391 A1 | 8/2014 | Adenuga |
| 2014/0256251 A1 | 9/2014 | Caceres et al. |
| 2014/0258099 A1 | 9/2014 | Rosano |
| 2014/0258113 A1 | 9/2014 | Gauthier et al. |
| 2014/0258125 A1 | 9/2014 | Gerber et al. |
| 2014/0274179 A1 | 9/2014 | Zhu et al. |
| 2014/0279479 A1 | 9/2014 | Maniar et al. |
| 2014/0337235 A1 | 11/2014 | Van Heerden et al. |
| 2014/0339315 A1 | 11/2014 | Ko |
| 2014/0344163 A1 | 11/2014 | Zhang et al. |
| 2014/0346860 A1 | 11/2014 | Aubry et al. |
| 2014/0365780 A1 | 12/2014 | Movassaghi |
| 2014/0379361 A1 | 12/2014 | Mahadkar et al. |
| 2015/0012444 A1 | 1/2015 | Brown et al. |
| 2015/0032635 A1 | 1/2015 | Guise |
| 2015/0071486 A1 | 3/2015 | Rhoads et al. |
| 2015/0077228 A1 | 3/2015 | Dua |
| 2015/0088757 A1 | 3/2015 | Zhou et al. |
| 2015/0089586 A1 | 3/2015 | Ballesteros |
| 2015/0134452 A1 | 5/2015 | Williams |
| 2015/0140960 A1 | 5/2015 | Powell et al. |
| 2015/0154595 A1 | 6/2015 | Collinge et al. |
| 2015/0170138 A1 | 6/2015 | Rao |
| 2015/0178724 A1 | 6/2015 | Ngo et al. |
| 2015/0186871 A1 | 7/2015 | Laracey |
| 2015/0205379 A1 | 7/2015 | Mag et al. |
| 2015/0302409 A1 | 10/2015 | Malek |
| 2015/0317626 A1 | 11/2015 | Ran et al. |
| 2015/0332266 A1 | 11/2015 | Friedlander et al. |
| 2015/0339474 A1 | 11/2015 | Paz et al. |
| 2015/0371229 A1 | 12/2015 | Prakash et al. |
| 2015/0371234 A1 | 12/2015 | Huang et al. |
| 2016/0012465 A1 | 1/2016 | Sharp |
| 2016/0026997 A1 | 1/2016 | Tsui et al. |
| 2016/0042341 A1 | 2/2016 | Griffin et al. |
| 2016/0048913 A1 | 2/2016 | Rausaria et al. |
| 2016/0055480 A1 | 2/2016 | Shah |
| 2016/0057619 A1 | 2/2016 | Lopez |
| 2016/0065370 A1 | 3/2016 | Le Saint et al. |
| 2016/0087957 A1 | 3/2016 | Shah et al. |
| 2016/0092696 A1 | 3/2016 | Guglani et al. |
| 2016/0148193 A1 | 5/2016 | Kelley et al. |
| 2016/0227593 A1 | 8/2016 | Neafsey et al. |
| 2016/0232523 A1 | 8/2016 | Venot et al. |
| 2016/0239672 A1 | 8/2016 | Khan et al. |
| 2016/0253651 A1 | 9/2016 | Park et al. |
| 2016/0255072 A1 | 9/2016 | Liu |
| 2016/0267486 A1 | 9/2016 | Mitra et al. |
| 2016/0277383 A1 | 9/2016 | Guyomarc'h et al. |
| 2016/0277388 A1 | 9/2016 | Lowe et al. |
| 2016/0307187 A1 | 10/2016 | Guo et al. |
| 2016/0307189 A1 | 10/2016 | Zarakas et al. |
| 2016/0314472 A1 | 10/2016 | Ashfield |
| 2016/0330027 A1 | 11/2016 | Ebrahimi |
| 2016/0335531 A1 | 11/2016 | Mullen et al. |
| 2016/0364938 A1 | 12/2016 | Miranda et al. |
| 2016/0379217 A1 | 12/2016 | Hammad |
| 2017/0004502 A1 | 1/2017 | Quentin et al. |
| 2017/0011395 A1 | 1/2017 | Pillai et al. |
| 2017/0011406 A1 | 1/2017 | Tunnell et al. |
| 2017/0017957 A1 | 1/2017 | Radu |
| 2017/0017964 A1 | 1/2017 | Janefalkar et al. |
| 2017/0024716 A1 | 1/2017 | Jiam et al. |
| 2017/0039566 A1 | 2/2017 | Schipperheijn |
| 2017/0041759 A1 | 2/2017 | Gantert et al. |
| 2017/0068950 A1 | 3/2017 | Kwon |
| 2017/0103388 A1 | 4/2017 | Pillai et al. |
| 2017/0104739 A1 | 4/2017 | Lansler et al. |
| 2017/0109509 A1 | 4/2017 | Baghdasaryan |
| 2017/0109730 A1 | 4/2017 | Locke et al. |
| 2017/0116447 A1 | 4/2017 | Cimino et al. |
| 2017/0124568 A1 | 5/2017 | Moghadam |
| 2017/0140379 A1 | 5/2017 | Deck |
| 2017/0148011 A1 | 5/2017 | Killoran, Jr. et al. |
| 2017/0154328 A1 | 6/2017 | Zarakas et al. |
| 2017/0154333 A1 | 6/2017 | Gleeson et al. |
| 2017/0180134 A1 | 6/2017 | King |
| 2017/0230189 A1 | 8/2017 | Toll et al. |
| 2017/0237301 A1 | 8/2017 | Elad et al. |
| 2017/0289127 A1 | 10/2017 | Hendrick |
| 2017/0295013 A1 | 10/2017 | Claes |
| 2017/0316696 A1 | 11/2017 | Bartel |
| 2017/0317834 A1 | 11/2017 | Smith et al. |
| 2017/0330173 A1 | 11/2017 | Woo et al. |
| 2017/0374070 A1 | 12/2017 | Shah et al. |
| 2018/0034507 A1 | 2/2018 | Wobak et al. |
| 2018/0039986 A1 | 2/2018 | Essebag et al. |
| 2018/0068316 A1 | 3/2018 | Essebag et al. |
| 2018/0129945 A1 | 5/2018 | Saxena et al. |
| 2018/0160255 A1 | 6/2018 | Park |
| 2018/0191501 A1 | 7/2018 | Lindemann |
| 2018/0205712 A1 | 7/2018 | Versteeg et al. |
| 2018/0240106 A1 | 8/2018 | Garrett et al. |
| 2018/0254909 A1 | 9/2018 | Hancock |
| 2018/0268132 A1 | 9/2018 | Buer et al. |
| 2018/0270214 A1 | 9/2018 | Caterino et al. |
| 2018/0294959 A1 | 10/2018 | Traynor et al. |
| 2018/0300716 A1 | 10/2018 | Carlson |
| 2018/0302396 A1 | 10/2018 | Camenisch et al. |
| 2018/0315050 A1 | 11/2018 | Hammad |
| 2018/0316666 A1 | 11/2018 | Koved et al. |
| 2018/0322486 A1 | 11/2018 | Deliwala et al. |
| 2018/0359100 A1 | 12/2018 | Gaddam et al. |
| 2019/0014107 A1 | 1/2019 | George |
| 2019/0019375 A1 | 1/2019 | Foley |
| 2019/0036678 A1 | 1/2019 | Ahmed |
| 2019/0205244 A1 | 7/2019 | Smith |
| 2019/0238517 A1 | 8/2019 | D'Agostino et al. |
| 2019/0363746 A1 | 11/2019 | Zalewski et al. |
| 2020/0019725 A1 | 1/2020 | Rule et al. |
| 2020/0250672 A1* | 8/2020 | Rule .................. G07F 7/0833 |
| 2020/0351263 A1* | 11/2020 | Tiruvaipeta ......... H04L 63/0838 |
| 2021/0042064 A1* | 2/2021 | Ando ................. H04L 67/1097 |
| 2021/0272098 A1* | 9/2021 | Delsuc .................. H04W 4/80 |

FOREIGN PATENT DOCUMENTS

| | | |
|---|---|---|
| CA | 3010336 | 7/2017 |
| CN | 101192295 | 6/2008 |
| CN | 103023643 | 4/2013 |
| CN | 103417202 | 12/2013 |
| CN | 108885670 | 11/2018 |
| DE | 602004012602 | 4/2008 |
| EP | 1 085 424 | 3/2001 |
| EP | 1 223 565 | 7/2002 |
| EP | 1 265 186 | 12/2002 |
| EP | 1 783 919 | 5/2007 |
| EP | 2 852 070 | 1/2009 |
| EP | 2 139 196 | 12/2009 |
| EP | 1 469 419 | 2/2012 |
| EP | 2 566 208 | 3/2013 |
| EP | 3 065 366 | 9/2016 |
| GB | 2 457 221 | 8/2009 |
| GB | 2 516 861 | 2/2015 |
| GB | 2 551 907 | 1/2018 |
| JP | 2002133324 | 5/2002 |
| JP | 2017517825 | 6/2017 |
| KR | 101508320 | 4/2015 |
| WO | WO 00/49586 | 8/2000 |
| WO | WO 2006070189 | 7/2006 |
| WO | WO 2008055170 | 5/2008 |

(56) References Cited

FOREIGN PATENT DOCUMENTS

| | | |
|---|---|---|
| WO | WO 2009025605 | 2/2009 |
| WO | WO 2010049252 | 5/2010 |
| WO | WO 2011112158 | 9/2011 |
| WO | WO 2012001624 | 1/2012 |
| WO | WO 2013039395 | 3/2013 |
| WO | WO 2013090797 | 6/2013 |
| WO | WO 2013155562 | 10/2013 |
| WO | WO 2013192358 | 12/2013 |
| WO | WO 2014043278 | 3/2014 |
| WO | WO 2014170741 | 10/2014 |
| WO | WO 2015078376 | 6/2015 |
| WO | WO 2015179649 | 11/2015 |
| WO | WO 2015183818 | 12/2015 |
| WO | WO 2016097718 | 6/2016 |
| WO | WO 2016160816 | 10/2016 |
| WO | WO 2016164706 | 10/2016 |
| WO | WO 2016168394 | 10/2016 |
| WO | WO 2017042375 | 3/2017 |
| WO | WO 2017042400 | 3/2017 |
| WO | WO 2017157859 | 9/2017 |
| WO | WO 2017208063 | 12/2017 |
| WO | WO 2018063809 | 4/2018 |
| WO | WO 2018137888 | 8/2018 |

OTHER PUBLICATIONS

Batina, Lejla and Poll, Erik, "SmartCards and RFID," PowerPoint Presentation for IPA Security Course, Digital Security at University of Nijmegen, Netherlands (date unknown), 75 pages.

Haykin M. and Warnar, R., "Smart Card Technology: New Methods for Computer Access Control," Computer Science and Technology NIST Special Publication 500-157:1-60 (1988).

Lehpamer, Harvey, "Component of the RFID System," RFID Design Principles, 2nd edition pp. 133-201 (2012).

Pourghomi, Pardis et al., "A Proposed NFC Payment Application," International Journal of Advanced Computer Science and Applications, vol. 4, No. 8 (2013).

Author Unknown, "CardrefresherSM from American Express®," [online] 2019 [retrieved on Mar. 25, 2019]. Retrieved from Internet URL: https://merchant-channel.americanexpress.com/merchant/en_US/cardrefresher, 2 pages.

Author Unknown, "Add Account Updater to your recurring payment tool," [online] 2018-19 [retrieved on Mar. 25, 2019]. Retrieved from Internet URL: https://www.authorize.net/our-features/account-updater/, 5 pages.

Author Unknown, "Visa® Account Updater for Merchants," [online] 2019 [retrieved on Mar. 25, 2019]. Retrieved from Internet URL: https://usa.visa.com/dam/VCOM/download/merchants/visa-account-updater-product-information-fact-sheet-for-merchants.pdf, 2 pages.

Author Unknown, "Manage the cards that you use with Apple Pay," Apple Support [online] 2019 [retrieved on Mar. 25, 2019]. Retrieved from Internet URL: https://support.apple.com/en-us/HT205583, 5 pages.

Author Unknown, "Contactless Specifications for Payment Systems," EMV Book B—Entry Point Specification [online] 2016 [retrieved on Mar. 25, 2019]. Retrieved from Internet URL: https://www.emvco.com/wp-content/uploads/2017/05/BookB_Entry_Point_Specification_v2_6_20160809023257319.pdf, 52 pages.

Author Unknown, "EMV Integrated Circuit Card Specifications for Payment Systems, Book 2, Security and Key Management," Version 3.4, [online] 2011 [retrieved on Mar. 25, 2019]. Retrieved from Internet URL: https://www.emvco.com/wp-content/uploads/2017/05/EMV_v4.3_Book_2_Security_and_Key_Management_20120607061923900.pdf, 174 pages.

Author unknown, "NFC Guide: All You Need to Know About Near Field Communication" Square Guide [online] 2018[retrieved on Nov. 13, 2018]. Retrieved from Internet URL: https://squareup.com/guides/nfc, 8 pages.

Profis, S., "Everything you need to know about NFC and mobile payments" CNET Directory [online], 2014 [retrieved on Mar. 25, 2019]. Retrieved from the Internet URL: https://www.cnet.com/how-to/how-nfc-works-and-mobile-payments/, 6 pages.

Cozma, N., "Copy data from other devices in Android 5.0 Lollipop setup" CNET Directory [online] 2014 [retrieved on Mar. 25, 2019]. Retrieved from the Internet URL: https://www.cnet.com/how-to/copy-data-from-other-devices-in-android-5-0-lollipop-setup/, 5 pages.

Kevin, Android Enthusiast, "How to copy text siring from nfc tag" StackExchange [online] 2013 [retrieved on Mar. 25, 2019]. Retrieved from the Internet URL: https://android.stackexchange.com/questions/55689/how-to-copy-text-stiing-from-nfc-tag, 11 pages.

Author unknown, "Tap & Go Device Setup" Samsung [online] date unknown [retrieved on Mar. 25, 2019]. Retrieved from the Internet URL: https://www.samsung.com/us/switch-me/switch-to-the-galaxy-s-5/app/partial/setup-device/tap-go.html, 1 page.

Author Unknown, "Multiple encryption", Wikipedia [online] 2019 [retrieved on Mar. 25, 2019]. Retrieved from Internet URL: https://en.wikipedia.org/wiki/Multiple_encryption, 4 pages.

Krawczyk, et al., "HMAC: Keyed-Hashing for Message Authentication", Network Working Group RFC:2104 memo [online] 1997 [retrieved on Mar. 25, 2019]. Retrieved from Internet URL: https://tools.ietf.org/html/rfc2104, 12 pages.

Song, et al., "The AES-CMAC Algorithm", Network Working Group RFC: 4493 memo [online] 2006 [retrieved on Mar. 25, 2019]. Retrieved from Internet URL: https://tools.ietf.org/html/rfc4493, 21 pages.

Katz, J., and Lindell, Y., "Aggregate Message Authentication Codes", Topics in Cryptology [online] 2008 [retrieved on Mar. 25, 2019]. Retrieved from Internet URL: https://www.cs.umd.edu/~jkatz/papers/aggregateMAC.pdf, 11 pages.

Adams, D., and Maier, A-K, "Goldbug BIG SEVEN open source crypto-messengers to be compared—: or Comprehensive Confidentiality Review & Audit of GoldBug Encrypting E-Mail—Client & Secure Instant Messenger", Big Seven Study 2016 [online] [retrieved on Mar. 25, 2018]. Retrieved from Internet URL: https://sf.net/projects/goldbug/files/bigseven-crypto-audit.pdf, 309 pages.

Author Unknown, "Triple DES", Wikipedia [online] 2018 [retrieved on Mar. 25, 2019]. Retrieved from Internet URL: https://simple.wikipedia.org/wiki/Triple_DES, 2 pages.

Song, F., and Yun, A.l, "Quantum Security of NMAC and Related Constructions—PRF domain extension against quantum attacks", IACR Cryptology ePrint Archive [online] 2017 [retrieved on Mar. 25, 2019]. Retrieved from Internet URL: https://eprint.iacr.org/2017/509.pdf, 41 pages.

Saxena, N., "Lecture 10: NMAC, HMAC and Number Theory", CS 6903 Modern Cryptography [online] 2008 [retrieved on Mar. 25, 2019]. Retrieved from Internet URL: http://isis.poly.edu/courses/cs6903/Lectures/lecture10.pdf, 8 pages.

Berg, Guy, "Fundamentals of EMV" Smart Card Alliance [online] date unknown [retrieved on Mar. 27, 2019]. Retrieved from Internet URL: https://www.securetechalliance.org/resources/media/scapl3_preconference/02.pdf, 37 pages.

Pierce, Kevin, "Is the amazon echo NFC compatible,?" Amazon.com Customer Q&A [online] 2016 [retrieved on Mar. 26, 2019]. Retrieved from Internet URL: https://www.amazon.com/ask/questions/Tx1RJXYSPE6XLJD?_encodi . . . , 2 pages.

Author Unknown, "Multi-Factor Authentication", idaptive [online] 2019 [retrieved on Mar. 25, 2019]. Retrieved from Internet URL: https://www.centrify.com/products/application-services/adaptive-multi-factor-authentication/risk-based-mfa/, 10 pages.

Author Unknown, "Adaptive Authentication", SecureAuth [online] 2019 [retrieved on Mar. 25, 2019}. Retrieved from Internet URL: https://www.secureauth.com/products/access-management/adaptive-authentication, 7 pages.

Van den Breekel, J., et al., "EMV in a nutshell", Technical Report, 2016 [retrieved on Mar. 25, 2019]. Retrieved from Internet URL: https://www.cs.ru.nl/E.Poll/papers/EMVtechreport.pdf, 37 pages.

Author Unknown, "Autofill", Computer Hope [online] 2018 [retrieved on Mar. 25, 2019]. Retrieved from Internet URL: https://www.computerhope.com/jargon/a/autofill.htm, 2 pages.

Author Unknown, "Fill out forms automatically", Google Chrome Help [online] 2019 [retrieved on Mar. 25, 2019]. Retrieved from Internet URL: https://support.google.com/chrome/answer/142893?co=GENIE.Platform%3DDesktop&hl=en, 3 pages.

(56) References Cited

OTHER PUBLICATIONS

Author unknown, "Autofill credit cards, contacts, and passwords in Safari on Mac", Apple Safari User Guide [online] 2019 [retrieved on Mar. 25, 2019]. Retrieved from Internet URL: https://support.apple.com/guide/safari/use-autofill-ibrw1103/mac, 3 pages.

Menghin, M.J., "Power Optimization Techniques for Near Field Communication Systems" 2014 Dissertation at Technical University of Graz [online]. Retrieved from Internet URL: https://diglib.tugraz.at/download.php?id=576a7b910d2d6&location=browse, 135 pages.

Mareli, M., et al., "Experimental evaluation of NFC reliability between an RFID tag and a smartphone" Conference paper (2013) IEEE AFRICON At Mauritius [online] [retrieved on Mar. 25, 2019]. Retrieved from Internet URL: https://core.ac.uk/download/pdf/54204839.pdf, 5 pages.

Davison, A., et al., "MonoSLAM: Real-Time Single Camera SLAM", IEEE Transactions on Pattern Analysis and Machine Intelligence 29(6): 1052-1067 (2007).

Barba, R., "Sharing your location with your bank sounds creepy, but it's also useful", Bankrate, LLC [online] 2017 [retrieved on Mar. 25, 2019]. Retrieved from Internet URL: https://www.bankrate.com/banking/banking-app-location-sharing/, 6 pages.

Author unknown: "onetappayment™", [online] Jan. 24, 2019, [retrieved on Mar. 25, 2019]. Retrieved from Internet URL: https://www.payubiz.in/onetap, 4 pages.

Vu et al., (2012). "Distinguishing users with capacitive touch communication" Proceedings of the Annual International Conference on Mobile Computing and Networking, MOBICOM. 10.1145/2348543.2348569.

EMVCo, EMV Card Personalization Specification, version 1.0 (Jun. 2003), 81 pages.

Ullmann et al., (2012). "On-Card" User Authentication for Contactless Smart Cards based on Gesture Recognition, LNI, 223-234, 12 pages.

Faraj et al. (2008). "Investigation of Java Smart Card Technology for Multi-Task Applications" J. of Al-Anbar University for Pure Science, vol. 2: No. 1: 2008, 11 pages.

Dhamdhere (2017) "Key Benefits of a Unified Platform for Loyalty, Referral Marketing, and UGC" Annex Cloud [retrieved on Jul. 3, 2019]. Retrieved from Internet URL: https://www.annexcloude.com/blog/benefits-unified-platform/, 13 pages.

International Search Report and the Written Opinion of the International Searching Authority issued in related PCT Application No. PCT/US2022/013978 dated May 9, 2022.

\* cited by examiner

200

SYSTEMS AND METHODS FOR AUTHENTICATED PEER-TO-PEER DATA TRANSFER USING RESOURCE LOCATORS

FIELD OF THE DISCLOSURE

The present disclosure relates to systems and methods for peer-to-peer data transfers, and in particular, authenticated peer-to-peer data transfer using resource locators.

BACKGROUND

When two peer devices are not already connected through an existing network, peer-to-peer data transfers may be cumbersome. This is because both peer devices must be registered with and configured for communication on the same network in order to accomplish the transfer. In addition, configuring and scheduling the transfer of data may be detrimental to the user experience. Security risks are also present, and may include risks associated with data integrity and vulnerability when crossing between platforms, and the misidentification of an account by the use of an email address or other account identifier. These risks and shortcomings may reduce user demand for cross-application communication and inhibit the functionality and efficiency of cross-application communications.

These and other deficiencies exist. Accordingly, there is a need for systems and methods for peer-to-peer data transfer that provide enhanced security and an improved user experience.

SUMMARY OF THE DISCLOSURE

Embodiments of the present disclosure provide an authenticated data transfer system, including a contactless card comprising a processor and a memory. After entering a communication field, the processor may be configured to dynamically generate a uniform resource locator (URL). The URL may include a first set of information including abstracted identifier information. The URL may include a second set of information including user information. The processor may be configured to transmit the URL to initiate data transfer. The data transfer may be completed upon verification of a received response and confirmation of a third set of information associated with the data transfer.

Embodiments of the present disclosure provide a method of authenticating data transfer. The method may include dynamically generating, after entry of one or more processors of a transmitting device into a communication field, the link comprising a near field communication data exchange format uniform resource locator including identifier data and user data. The method may include transmitting, to a first application comprising instructions for execution on a first device, the link to initiate data transfer. The method may include authenticating a user associated with the first device by activating one or more actions based on the link. The method may include transmitting one or more requests for confirmation of quantity and recipient data associated with the data transfer. The method may include receiving one or more notifications that are based on the one or more requests for confirmation of quantity and recipient data associated with the data transfer. The method may include performing one or more login credentials that are responsive to the one or more notifications so as to complete the data transfer.

Embodiments of the present disclosure provide a computer readable non-transitory medium comprising computer-executable instructions that, when executed by a processor, perform procedures comprising the steps of: dynamically generating, after entry of a contactless card into a communication field, a link, the link comprising a first set of information and a second set of information, the first set of information including identifier information, the second set of information including user information; transmitting, to a first application comprising instructions for execution on a first device, the link to initiate data transfer; identifying a user associated with the first device by activating one or more actions based on the link, the one or more actions configured to request confirmation of a third set of information associated with the data transfer; and transmitting one or more responses based on authentication of the third set of information so as to complete the data transfer.

BRIEF DESCRIPTION OF THE DRAWINGS

Various embodiments of the present disclosure, together with further objects and advantages, may best be understood by reference to the following description taken in conjunction with the accompanying drawings.

DETAILED DESCRIPTION

Figure 1:
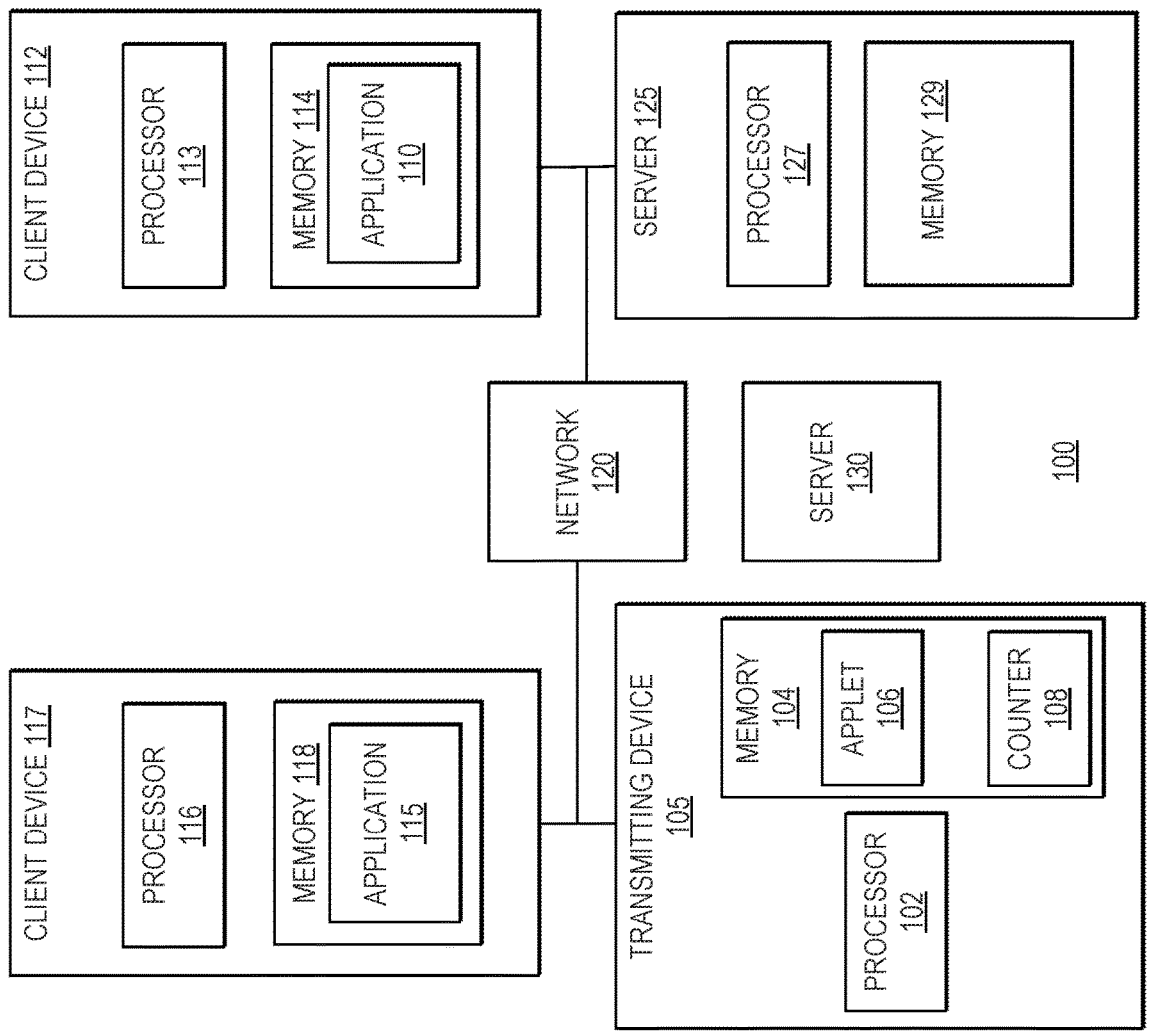
FIG. 1 depicts an authenticated data transfer system according to an exemplary embodiment.

The following description of embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

As disclosed herein, a user may use their card to for seamless identification and to also initiate a data transfer. A resource locator, such as a uniform resource locator (URL), internet resource locator (IRL), uniform resource identifier (URI), uniform resource name (URN), or other resource locator, may include abstracted identification information, including but not limited to an account or user identifier for a cardholder, which is loaded onto the chip at the time of personalization of the card. The abstracted identification information may be generated for each transaction, such as the dynamically generated URL.

Without limitation, the identification information may be generated on the card by combining a unique identifier with one or more variables, such as a counter, one or more cryptographic algorithms, and/or any combination thereof.

For example, the one or more cryptographic algorithms may include an encryption technique, such as public or private key encryption, that would also be known by a server for authentication. Without limitation, exemplary symmetric key algorithms may include symmetric key encryption such as DES (Data Encryption Standard), Triple DES, or AES (Advanced Encryption Standard). Without limitation, exemplary asymmetric key algorithms may include asymmetric public key encryption, digital signature algorithm, or RSA (Rivest-Shamir-Adleman).

In some examples, the peer-to-peer data transfer may be initiated and authenticated through a website. In other examples, the peer-to-peer data transfer may be initiated and authenticated through an application. The systems and methods disclosed herein minimize the exposure of identification information or other personal information and provide greater security.

Example embodiments of the present disclosure provide improvements to the limitations in the user experience to set up and coordinate different types of data transfer, and mitigate or eliminate security risks, such as those associated with crossing between platforms, misidentification of an account by email address, authentication of the requested transfer of data, and validity of device recognition. Accordingly, the systems and methods disclosed herein improve upon existing implementations by coordinating customized peer-to-peer data transfer that addresses these limitations and provides enhanced security benefits and an improved user experience.

FIG. 1 illustrates an authenticated data transfer system 100. The authenticated data transfer system 100 may comprise a transmitting device 105, a first application 110, a second application 115, a network 120, a server 125, and a database 130. Although FIG. 1 illustrates single instances of components of system 100, system 100 may include any number of components.

System 100 may include a transmitting device 105. The transmitting device 105 may comprise a contactless card, a contact-based card, a network-enabled computer, or other device described herein. As further explained below in FIGS. 2A-2B, transmitting device 105 may include one or more processors 102, and memory 104. Memory 104 may include one or more applets 106 and one or more counters 108. Transmitting device 105 may be in data communication with one or more devices 112, 117. For example, transmitting device may transmit data via network 120 to client devices 112, 117. In some examples, transmitting device 105 may be configured to transmit data via network 120 to client device 117 after entry into one or more communication fields of client devices 112, 117. Without limitation, transmitting device 105 may be configured to transmit data to client devices 112, 117 after one or more entries into the one or more communication fields of client devices 112, 117, the one or more entries associated with a tap, a swipe, a wave, and/or any combination thereof.

System 100 may include a first application 110. For example, first application 110 may comprise instructions for execution on a first device 112. First application 110 may be in communication with any components of system 100. For example, first device 112 may execute one or more applications, such as first application 110, that enable, for example, network and/or data communications with one or more components of system 100 and transmit and/or receive data. The first device 112 may include one or more processors 113 coupled to memory 114. For example, first device 112 may be a network-enabled computer. As referred to herein, a network-enabled computer may include, but is not limited to a computer device, or communications device including, e.g., a server, a network appliance, a personal computer, a workstation, a phone, a handheld PC, a personal digital assistant, a contactless card, a thin client, a fat client, an Internet browser, or other device. First device 112 also may be a mobile device; for example, a mobile device may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The first device 112 may include processing circuitry and may contain additional components, including processors, memories, error and parity/CRC checkers, data encoders, anticollision algorithms, controllers, command decoders, security primitives and tamperproofing hardware, as necessary to perform the functions described herein. The first device 112 may further include a display and input devices. The display may be any type of device for presenting visual information such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touchscreen, keyboard, mouse, cursor-control device, touchscreen, microphone, digital camera, video recorder or camcorder. These devices may be used to enter information and interact with the software and other devices described herein. In some examples, the first device 112 may include at least one selected from the group of a mobile device, a wearable device, and a kiosk.

System 100 may include a second application 115. Second application 115 may comprise instructions for execution on a second device 117. Second application 115 may be in communication with any components of system 100. For example, second device 117 may execute one or more applications, such as second application 115, that enable, for example, network and/or data communications with one or more components of system 100 and transmit and/or receive data. The second device 117 may include one or more processors 116 coupled to memory 118. For example, second device 117 may be a network-enabled computer. As referred to herein, a network-enabled computer may include, but is not limited to a computer device, or communications device including, e.g., a server, a network appliance, a personal computer, a workstation, a phone, a handheld PC, a personal digital assistant, a contactless card, a thin client, a fat client, an Internet browser, or other device. Second device 117 also may be a mobile device; for example, a mobile device may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The second device 117 may include processing circuitry and may contain additional components, including processors, memories, error and parity/CRC checkers, data encoders, anticollision algorithms, controllers, command decoders, security primitives and tamperproofing hardware, as necessary to perform the functions described herein. The second device 117 may further include a display and input devices. The display may be any type of device for presenting visual information such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touch-screen, keyboard, mouse, cursor-control device, touch-screen, microphone, digital camera, video recorder or camcorder. These devices may be used to enter information and interact with the software and other devices described herein. In some examples, the second device 117 may include at least one selected from the group of a mobile device, a wearable device, and a kiosk.

System 100 may include a network 120. In some examples, network 120 may be one or more of a wireless network, a wired network or any combination of wireless network and wired network, and may be configured to connect to any one of components of system 100. For example, client devices 112, 117 may be configured to connect to server 125 via network 120. In some examples, network 120 may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

In addition, network 120 may include, without limitation, telephone lines, fiber optics, IEEE Ethernet 902.3, a wide area network, a wireless personal area network, a LAN, or a global network such as the Internet. In addition, network 120 may support an Internet network, a wireless communication network, a cellular network, or the like, or any combination thereof. Network 120 may further include one network, or any number of the exemplary types of networks mentioned above, operating as a stand-alone network or in cooperation with each other. Network 120 may utilize one or more protocols of one or more network elements to which they are communicatively coupled. Network 120 may translate to or from other protocols to one or more protocols of network devices. Although network 120 is depicted as a single network, it should be appreciated that according to one or more examples, network 120 may comprise a plurality of interconnected networks, such as, for example, the Internet, a service provider's network, a cable television network, corporate networks, such as credit card association networks, and home networks.

Client devices 112, 117 may be in communication with one or more servers 125 via one or more networks 120, and may operate as a respective front-end to back-end pair with server 125. Client devices 112, 117 may transmit, for example from a mobile device application 110, 115 executing thereon, one or more requests to server 125. The one or more requests may be associated with retrieving data from server 125. Server 125 may receive the one or more requests from client devices 112, 117. Based on the one or more requests from client applications 110, 115, server 125 may be configured to retrieve the requested data. Server 125 may be configured to transmit the received data to client applications 110, 115, the received data being responsive to one or more requests.

System 100 may include one or more servers 125. In some examples, server 125 may include one or more processors 127 coupled to memory 129. Server 125 may be configured as a central system, server or platform to control and call various data at different times to execute a plurality of workflow actions. Server 125 may be configured to connect to one or client devices 112, 117. Server 125 may be in data communication with the client applications 110, 115. For example, a server 125 may be in data communication with the client applications 110, 115 via one or more networks 120.

System 100 may include one or more databases 130. The database 130 may comprise a relational database, a non-relational database, or other database implementations, and any combination thereof, including a plurality of relational databases and non-relational databases. In some examples, the database 130 may comprise a desktop database, a mobile database, or an in-memory database. Further, the database 130 may be hosted internally by the devices 112, 117 or the database 130 may be hosted externally to the devices 112, 117, such as by a server 125, by a cloud-based platform, or in any storage device that is in data communication with the devices 112, 117. In some examples, database 130 may be in data communication with any number of components of system 100. For example, server 125 may be configured to retrieve the requested data from the database 130 that is transmitted by applications 110, 115. Server 125 may be configured to transmit the received data from database 130 to client applications 110, 115 via network 120, the received data being responsive to the transmitted one or more requests. In other examples, client applications 110, 115 may be configured to transmit one or more requests for the requested data from database 130 via network 120.

In some examples, exemplary procedures in accordance with the present disclosure described herein can be performed by a processing arrangement and/or a computing arrangement (e.g., computer hardware arrangement). Such processing/computing arrangement can be, for example entirely or a part of, or include, but not limited to, a computer/processor that can include, for example one or more microprocessors, and use instructions stored on a computer-accessible medium (e.g., RAM, ROM, hard drive, or other storage device). For example, a computer-accessible medium can be part of the memory of the client devices 112, 117 and/or server 125 or other computer hardware arrangement.

In some examples, a computer-accessible medium (e.g., as described herein above, a storage device such as a hard disk, floppy disk, memory stick, CD-ROM, RAM, ROM, etc., or a collection thereof) can be provided (e.g., in communication with the processing arrangement). The computer-accessible medium can contain executable instructions thereon. In addition or alternatively, a storage arrangement can be provided separately from the computer-accessible medium, which can provide the instructions to the processing arrangement so as to configure the processing arrangement to execute certain exemplary procedures, processes, and methods, as described herein above, for example.

In some examples, the transmitting device 105 may comprise a contact-based card. For example, the contact-based card may be configured to transmit, after establishing a connection with a device, a link to initiate data transfer. The link may comprise, for example, a URL, IRL, URI, or URN. Without limitation, the contact-based card may be configured to establish physical contact with a card reader of client device 112 (e.g., a chip reader or a magnetic stripe reader). The card reader may be integral, within, or external to the client device 112.

In other examples, the transmitting device 105 may comprise a contactless card. For example, the contactless card may be configured to, after entering a communication field, transmit to the first application 110, a link to initiate data transfer. The link may comprise, for example, a URL, IRL, URI, or URN. In some examples, the contactless card may enter the communication field of client device 112 via one or more gestures selected from the group of a tap, swipe, wave, or any combination thereof.

In some examples, the user may be identified based on a mobile network operator (MNO) lookup. In other examples, the user may be identified based on one or more cookies associated with prior account logins, e.g., logins to an account associated with the transmitting device, a separate account associated with the user, and/or other accounts. The link may comprise a near field communication data exchange format uniform resource locator (NDEF URL) and can be configured to invoke one or more actions or applications. In one example, the link may be configured to invoke a website, which can include causing a browser or other viewing application executing on client device 112 or another device to access and display a website and/or to cause the website to perform one or more actions (e.g., to display or submit information). In another example, the link may be configured to invoke an application executing on client device 112 or a separate device.

The link may comprise a first set of information and a second set of information. For example, the first set of information may include identifier information. The first set of information may comprise an abstracted user name generated by the processor after entry of the transmitting device 105 into the communication field. For example, the abstracted identification information may be generated for each transaction, in the form of, e.g., the dynamically generated URL. Without limitation, the identification information may be generated on the card by combining a unique identifier with one or more variables, such as a counter, one or more cryptographic algorithms, and/or any combination thereof. For example, the one or more cryptographic algorithms may include an encryption technique, such as public or private key encryption, that would also be known by a server, such as server 125, for authentication. Without limitation, exemplary symmetric key algorithms may include symmetric key encryption such as DES, Triple DES, or AES. Without limitation, exemplary asymmetric key algorithms may include asymmetric public key encryption, digital signature algorithm, or RSA. For example, the second set of information may include user information, such as cardholder information (e.g., account owner name, account number, expiration date, card verification value). The first application 110 may be configured to identify a user associated with the first device 112 by activating one or more actions based on the link. The one or more actions may be configured to request confirmation of a third set of information associated with the data transfer. The third set of information may include at least one selected from the group of a quantity, digital asset, and recipient information.

In some examples, at least one action may comprise launching a website configured to identify the user associated with the first device 112. Server 125 may be configured to identify the user associated with the first device 112 by at least one selected from the group of device fingerprinting of the first device 112 and a cookie stored on the first device 112. Without limitation, device fingerprinting may be based on at least one selected from the group of device configuration, device memory, device screen size, device operating system version, applications installed, phone carrier provider, third party cookies for websites, phone number tracking through mobile network operator (MNO) lookup, browser type, browser language, IP address, and/or any combination thereof of the first device 112. The website may be configured to display the second set of information and the third set of information on first device 112. After a successful identification of the user or owner of the first device 112, the website may be configured to load predetermined information including the second set of information. In some examples, the predetermined information may comprise user information, such as cardholder information. In some examples, this information may be embedded in and passed via the NDEF URL when the transmitting device 105 enters the communication field. The website may be further configured to allow a quantity to be specified, including but not limited to an amount. The website may be further configured to submit the transfer by selection of a button. Moreover, the website may be further configured to adjust recipient and/or transferor of the data transfer. For example, the directionality of the data transfer may be reversed. In some examples, by adjusting the directionality of the transfer, such as from transferor to recipient or from recipient to transferor, a corresponding message such as a push notification or email may be generated so as to indicate confirmation of the desired reversed directionality of the transfer. In some examples, the corresponding message may be displayed by the first application 110 and/or second application 115.

The second application 115 may be configured to transmit one or more responses associated with authentication and confirmation of the third set of information so as to complete the data transfer. In some examples, the second application 115 may be configured to receive a notification from first application 110, the notification requiring the one or more responses associated with confirmation of the third set of information. The second application 115 may be configured to perform one or more authentication communications associated with confirmation of the third set of information. For example, the data transfer may be completed upon verification of a received response and confirmation of the third set of information associated with the data transfer. In some examples, the one or more authentication communications may include at least one selected from the group of biometric communication and login communication.

In other examples, at least one action may comprise requesting, by the first application 110, one or more login credentials. The first application 110 may be configured to, upon submission of the requested one or more login credentials and upon authentication of the one or more login credentials, deep link to a screen with the second set of information and the third set of information. By way of example, deep linking described herein may refer to the NDEF URL being configured to link to a specific, generally searchable or indexed, portion of web content on a website, rather than a website's home page. The third set of information may include at least one selected from the group of a quantity, digital asset, and recipient information. In some examples, the second application 115 may be configured to receive a notification, the notification requiring the one or more responses associated with confirmation of the third set of information. The second application 115 may be configured to perform one or more authentication communications associated with confirmation of the third set of information. In some examples, the one or more authentication communications may include an authentication input. Exemplary authentication inputs can include, without limitation, entry of login credentials, account information, security information, biometric information and a combination thereof (e.g., entry of a user name, a password, an account number, a security code, a one-time passcode, an answer to a security question, a fingerprint, a facial scan, a retinal scan, a voice recognition, and logging into an application or website associated with an account or card-issuing institution).

The device associated with the transmitting device 105 user, such as the second application 115 of the second device 117 associated with a cardholder, may be configured to receive a notification, including but not limited to a push notification or email, that acts as a second confirmation of the amount, digital asset, and transfer recipient. To confirm the data transfer, the cardholder may select a button to take an action that is responsive to the requested authentication communication, such as providing an authentication input. Upon authentication of the login via the received authentication input, the transfer may be confirmed. In this manner, the peer-to-peer transfer would be for an authenticated user, after the confirmation, since the transfer is to a known recipient.

In some examples, the peer-to-peer transfer may comprise issuance of credit. The credit may be in accord with one or more spending restrictions. For example, the one or more spending restrictions may include a time limit, amount limit, geographic limit, merchant type, merchant limit, and/or any combination thereof. In some examples, the issuance of credit may be associated with one or more rewards and/or points. For example, the rewards and/or points may be issued and thereby added to a user reward or loyalty point program if the credit is used at a particular merchant, such as a restaurant, at a particular time, such as on the weekends. For example, the rewards and/or points may be adjusted for each of the transferor and the transferee, and may be adjusted based on redemption of the credit. For example, the rewards and/or points may be issued and thereby added to a user reward or loyalty point program if the credit is used at a particular merchant, such as a restaurant, and/or at a particular time, such as on the weekends. When the recipient or transferee uses the credit, the transferor may still accrue the rewards and/or points.

In other examples, the peer-to-peer transfer may comprise transfer of one or more digital assets. Without limitation, the digital asset may comprise an image or a document. Without limitation, the format type of the digital asset may include at least one selected from the group of a static image file (such as JPEG, PNG, SVG), a static document file (such as PDF, PSD), an animated file (such as GIF, SWF), and web code (such as HTML, CSS, JavaScript). The one or more digital assets may be identified for transfer. For example, the digital asset may be securely transmitted by launching a website and uploading the identified digital asset for transfer. In another example, the digital asset may be securely transmitted by opening an application or launching an email client in which the identified digital asset may be included as an attachment. In another example, digital asset may be identified as part of a uniform resource locator (URL) that is transmitted for retrieving the identified digital asset.

In other examples, the peer-to-peer transfer may comprise a funds transfer, such as a cash transfer. As with the issuance of credit, the funds transfer may be subject to one or more spending restrictions and/or one or more merchants. For example, the funds transfer may be subject to a restriction based on time limit, amount limit, geographic limit, merchant type, merchant limit, and/or any combination thereof. In some examples, the funds transfer may include a plurality of portions. For example, a first portion of the funds transfer may be transmitted prior to a second portion of the funds transfer. Any portion of the funds transfer may be transmitted at a predetermined time, including but not limited to a day, time, week, month, and/or any combination thereof. In this manner, the funds transfer may be transmitted in aggregate until satisfaction of the entire funds transfer.

In other examples, the peer-to-peer transfer may comprise issuance of a virtual gift card. As with the issuance of credit, the virtual gift card may be subject to one or more spending restrictions and/or one or more merchants. For example, the virtual gift card may be subject to time limit, amount limit, geographic limit, merchant type, merchant limit, and/or any combination thereof. In some examples, the peer-to-peer transfer may include a plurality of portions associated with various amounts of the virtual gift card. For example, a first portion of the peer-to-peer transfer may be transmitted prior to a second portion of the peer-to-peer transfer. Any portion of the transfer may be transmitted at a predetermined time, including but not limited to a day, time, week, month, and/or any combination thereof.

Figure 2A:
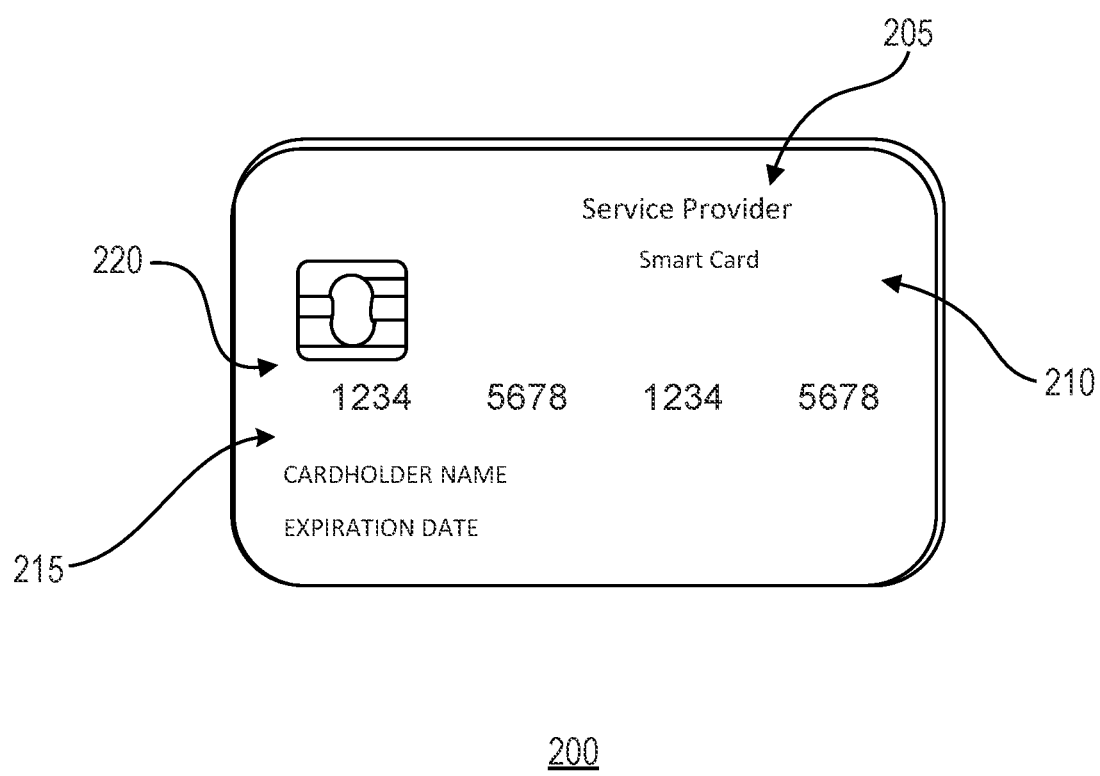
FIG. 2A is an illustration of a contactless card according to an exemplary embodiment.

FIG. 2A illustrates one or more transmitting devices 200. Transmitting device 200 may reference the same or similar components of transmitting device or contactless card 105, as explained above with respect to FIG. 1. Although FIGS. 2A and 2B illustrate single instances of components of transmitting device 200, any number of components may be utilized.

Transmitting device 200 may be configured to communicate with one or more components of system 100. Transmitting device 200 may comprise a contact-based card or contactless card, which may comprise a payment card, such as a credit card, debit card, or gift card, issued by a service provider 205 displayed on the front or back of the card 200. In some examples, the contactless card 200 is not related to a payment card, and may comprise, without limitation, an identification card, a membership card, and a transportation card. In some examples, the payment card may comprise a dual interface contactless payment card. The contactless card 200 may comprise a substrate 210, which may include a single layer or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the contactless card 200 may have physical characteristics compliant with the ID-1 format of the ISO/IEC 7810 standard, and the contactless card may otherwise be compliant with the ISO/IEC 14443 standard. However, it is understood that the contactless card 200 according to the present disclosure may have different characteristics, and the present disclosure does not require a contactless card to be implemented in a payment card.

The contactless card 200 may also include identification information 215 displayed on the front and/or back of the card, and a contact pad 220. The contact pad 220 may be configured to establish contact with another communication device, including but not limited to a user device, smart phone, laptop, desktop, or tablet computer. The contactless card 200 may also include processing circuitry, antenna and other components not shown in FIG. 2A. These components may be located behind the contact pad 220 or elsewhere on the substrate 210. The contactless card 200 may also include a magnetic strip or tape, which may be located on the back of the card (not shown in FIG. 2A).

Figure 2B:
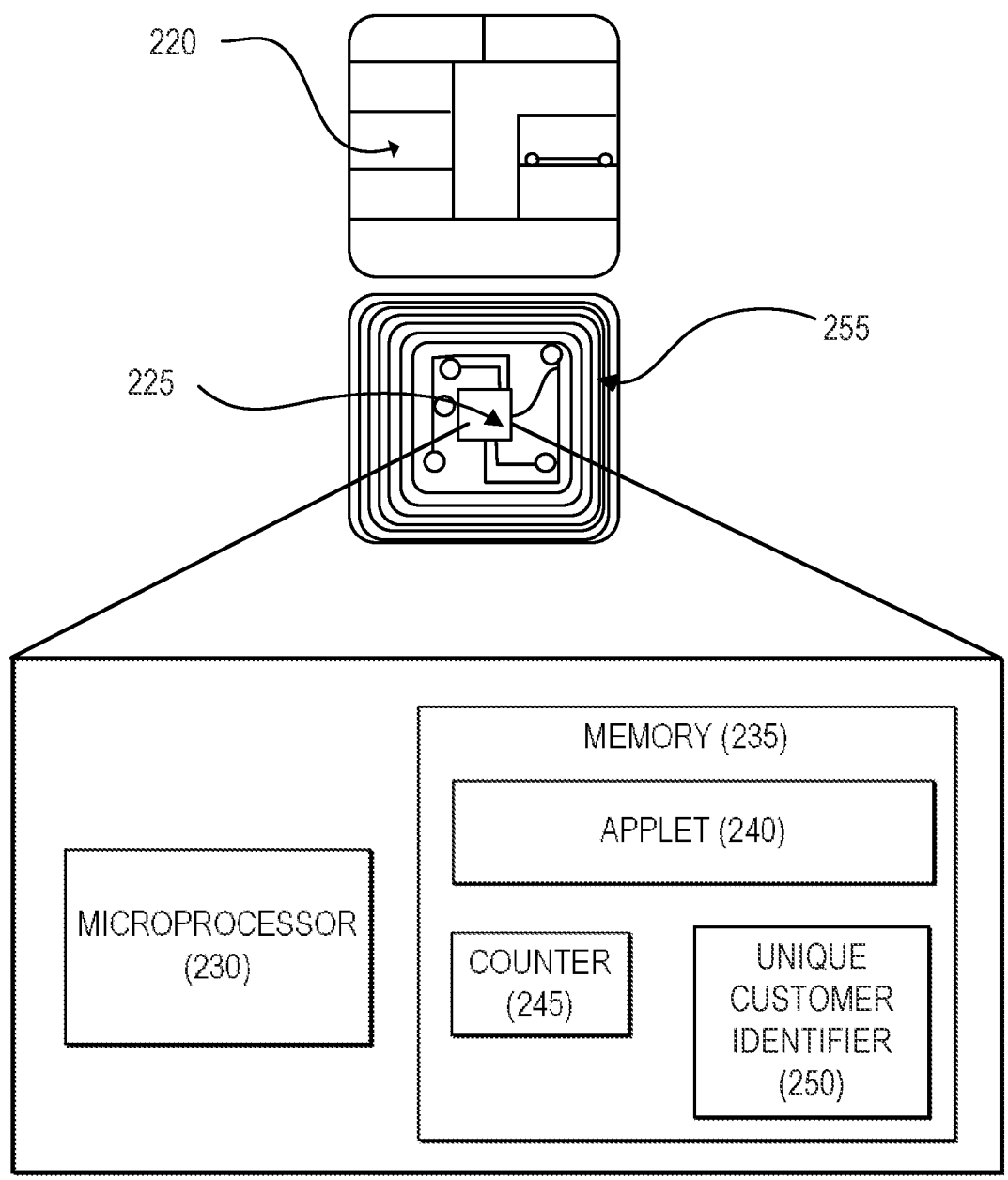
FIG. 2B is an illustration of a contact pad of the contactless card according to an exemplary embodiment.

As illustrated in FIG. 2B, the contact pad 220 of FIG. 2A may include processing circuitry 225 for storing and processing information, including a microprocessor 230 and a memory 235. It is understood that the processing circuitry 225 may contain additional components, including processors, memories, error and parity/CRC checkers, data encoders, anticollision algorithms, controllers, command decoders, security primitives and tamperproofing hardware, as necessary to perform the functions described herein.

The memory 235 may be a read-only memory, write-once read-multiple memory or read/write memory, e.g., RAM, ROM, and EEPROM, and the contactless card 200 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programed many times after leaving the factory. It may also be read many times.

The memory 235 may be configured to store one or more applets 240, one or more counters 245, and a customer identifier 250. The one or more applets 240 may comprise one or more software applications configured to execute on one or more contactless cards, such as Java Card applet. However, it is understood that applets 240 are not limited to Java Card applets, and instead may be any software application operable on contactless cards or other devices having limited memory. The one or more counters 245 may comprise a numeric counter sufficient to store an integer. The customer identifier 250 may comprise a unique alphanumeric identifier assigned to a user of the contactless card 200, and the identifier may distinguish the user of the contactless card from other contactless card users. In some examples, the customer identifier 250 may identify both a customer and an account assigned to that customer and may further identify the contactless card associated with the customer's account.

The processor and memory elements of the foregoing exemplary embodiments are described with reference to the contact pad, but the present disclosure is not limited thereto. It is understood that these elements may be implemented outside of the pad 220 or entirely separate from it, or as further elements in addition to processor 230 and memory 235 elements located within the contact pad 220.

In some examples, the contactless card 200 may comprise one or more antennas 255. The one or more antennas 255 may be placed within the contactless card 200 and around the processing circuitry 225 of the contact pad 220. For example, the one or more antennas 255 may be integral with the processing circuitry 225 and the one or more antennas 255 may be used with an external booster coil. As another example, the one or more antennas 255 may be external to the contact pad 220 and the processing circuitry 225.

In an embodiment, the coil of contactless card 200 may act as the secondary of an air core transformer. The terminal may communicate with the contactless card 200 by cutting power or amplitude modulation. The contactless card 200 may infer the data transmitted from the terminal using the gaps in the contactless card's power connection, which may be functionally maintained through one or more capacitors. The contactless card 200 may communicate back by switching a load on the contactless card's coil or load modulation. Load modulation may be detected in the terminal's coil through interference.

Figure 3:
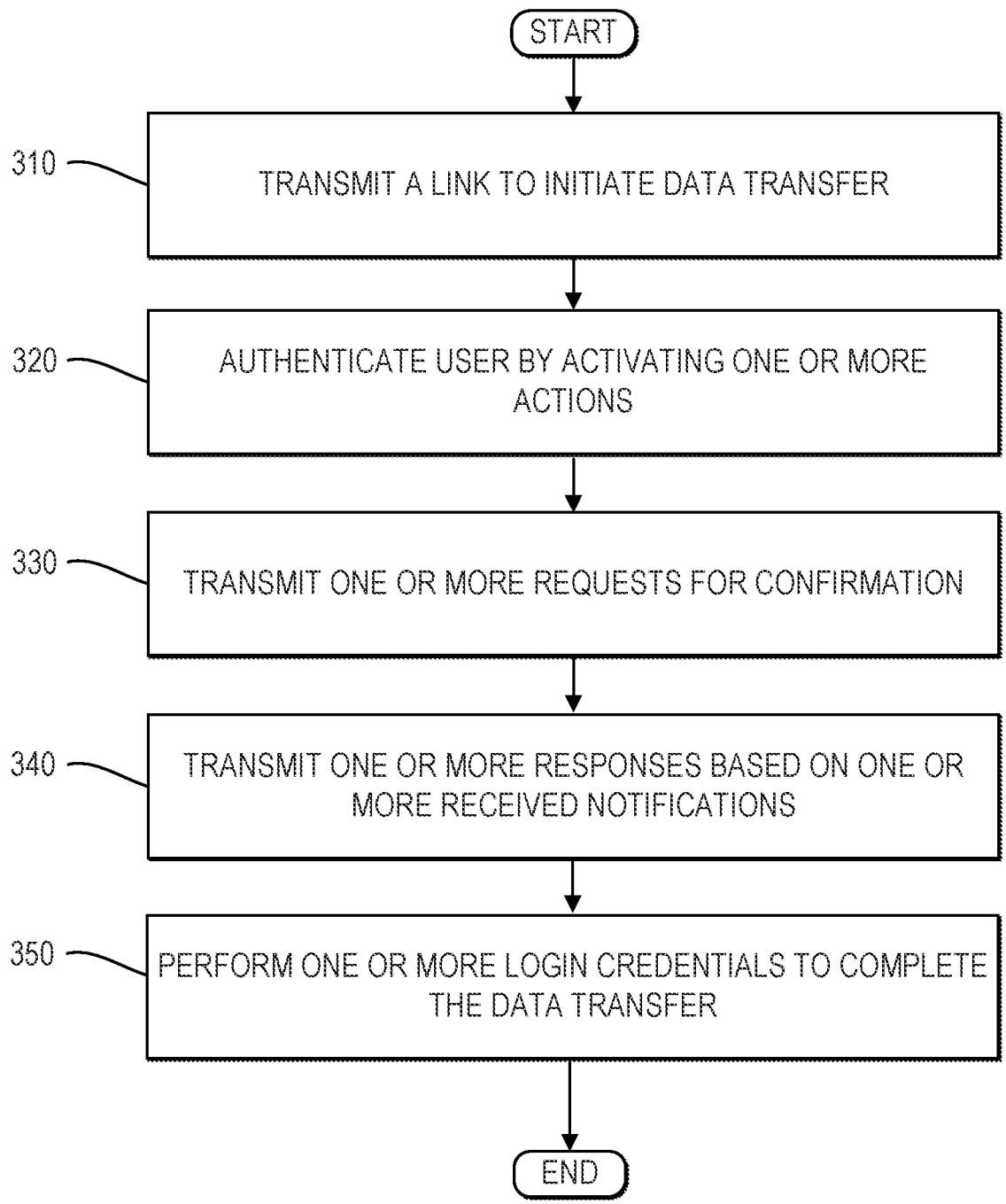
FIG. 3 depicts a method of authenticating data transfer according to an exemplary embodiment.

FIG. 3 depicts a method 300 of authenticating data transfer. FIG. 3 may reference the same or similar components of system 100, and transmitting device 200 of FIG. 2A and FIG. 2B.

At block 310, the method 300 may include transmitting, after one or more processors of a transmitting device entering a communication field, a link to a first application comprising instructions for execution on a first device, the link configured to initiate data transfer, the link comprising a near field communication data exchange format uniform resource locator including identifier data and cardholder data. In some examples, the transmittal of the link may occur after dynamically generating the link. In some examples, the transmitting device may enter the communication field of a client device via one or more gestures selected from the group of a tap, swipe, wave, or any combination thereof. In some examples, the user may be identified based on a mobile network operator (MNO) lookup. In other examples, the user may be identified based on one or more cookies associated with prior account logins, e.g., logins to an account associated with the transmitting device, a separate account associated with the user, and/or other accounts.

The link may comprise a near field communication data exchange format uniform resource locator (NDEF URL). The link may comprise a first set of information and a second set of information. The first set of information may include identifier information. For example, the first set of information may comprise an abstracted user name generated by the processor after entry of the transmitting device into the communication field. For example, the abstracted identification information may be generated for each transaction, such as the dynamically generated URL. Without limitation, the identification information may be generated on the card by combining a unique identifier with one or more variables, such as a counter, one or more cryptographic algorithms, and/or any combination thereof. For example, the one or more cryptographic algorithms may include an encryption technique, such as public or private key encryption, that would also be known by a server for authentication. Without limitation, exemplary symmetric key algorithms may include symmetric key encryption such as DES, Triple DES, or AES. Without limitation, exemplary asymmetric key algorithms may include asymmetric public key encryption, digital signature algorithm, or RSA. For example, the second set of information may include user information, such as cardholder information. In some examples, the second set of information may include cardholder information (e.g., account owner name, account number, expiration date, card verification value).

At block 320, the method 300 may include authenticating a user associated with the first device by activating one or more actions based on the link. The one or more actions may be configured to request confirmation of a third set of information associated with the data transfer. The third set of information may include at least one selected from the group of a quantity, digital asset, and recipient information. In some examples, at least one action may comprise launching a website configured to identify the user associated with the first device. In other examples, at least one action may comprise requesting, by the first application, one or more login credentials.

At block 330, the method 300 may include transmitting one or more requests for confirmation of quantity, digital asset, and recipient data associated with the data transfer. For example, the first application may be configured to receive input indicative of confirmation of the quantity, such as an amount, digital asset, and recipient data, such as recipient, of the peer-to-peer transfer that are associated with the third set of information of block 320.

At block 340, the method 300 may include receiving one or more notifications that are based on the one or more requests for confirmation of quantity, digital asset, and recipient data associated with the data transfer. The device associated with the transmitting device user, such as the second application of the second device associated with a cardholder, may be configured to receive a notification, including but not limited to a push notification or email, that acts as a second confirmation of the amount, digital asset, and transfer recipient.

At block 350, the method 300 may include performing one or more login credentials that are responsive to the one or more notifications so as to complete the data transfer. For example, one or more authentication inputs may be received to complete the data transfer. The authentication input may be responsive to the one or more notifications. To confirm the data transfer, the cardholder may select a button to take an action that is responsive to the one or more requests and based on the one or more notifications, such as the requested authentication communication including but an authentication input. Exemplary authentication inputs can include, without limitation, entry of login credentials, account information, security information, biometric information and a combination thereof (e.g., entry of a user name, a password, an account number, a security code, a one-time passcode, an answer to a security question, a fingerprint, a facial scan, a retinal scan, a voice recognition, and logging into an application or website associated with an account or card-issuing institution). Upon authentication of the login via the received authentication input, the transfer may be confirmed. In addition, the directionality of the data transfer may be reversed. In some examples, by adjusting the directionality of the transfer, such as from transferor to recipient or from recipient to transferor, a corresponding message such as a push notification or email may be generated so as to indicate confirmation of the desired reversed directionality of the transfer. In some examples, the corresponding message may be displayed by the first application and/or second application. In this manner, the peer-to-peer transfer would be for an authenticated user, after the confirmation, since the transfer is to a known recipient.

In some examples, the peer-to-peer transfer may comprise issuance of credit. The credit may be in accord with one or more spending restrictions. For example, the one or more spending restrictions may include a time limit, amount limit, geographic limit, merchant type, merchant limit, and/or any combination thereof.

In some examples, the peer-to-peer transfer may be associated with one or more rewards and/or points. For example, the rewards and/or points may be adjusted for each of the transferor and the transferee, and may be adjusted based on redemption of the credit. For example, the rewards and/or points may be issued and thereby added to a user reward or loyalty point program if the credit is used at a particular merchant, such as a restaurant, and/or at a particular time, such as on the weekends. When the recipient or transferee uses the credit, the transferor may still accrue the rewards and/or points. In some examples, the peer-to-peer transfer may include a plurality of portions. For example, a first portion of the peer-to-peer transfer may be transmitted prior to a second portion of the peer-to-peer transfer. For example, a first portion may comprise one or more rewards, and a second portion may comprise one or more points. Any portion of the transfer may be transmitted at a predetermined time, including but not limited to a day, time, week, month, and/or any combination thereof.

In other examples, the peer-to-peer transfer may comprise transfer of one or more digital assets. Without limitation, the digital asset may comprise an image or a document. Without limitation, the format type of the digital asset may include at least one selected from the group of a static image file (such as JPEG, PNG, SVG), a static document file (such as PDF, PSD), an animated file (such as GIF, SWF), and web code (such as HTML, CSS, JavaScript). The one or more digital assets may be identified for transfer. For example, the digital asset may be securely transmitted by launching a website and uploading the identified digital asset for transfer. In another example, the digital asset may be securely transmitted by opening an application or launching an email client in which the identified digital asset may be included as an attachment. In another example, the digital asset may be digital asset may be identified as part of a uniform resource locator (URL) that is transmitted for retrieving the identified digital asset.

In other examples, the peer-to-peer transfer may comprise a funds transfer, such as a cash transfer. As with the issuance of credit, the funds transfer may be subject to one or more spending restrictions and/or one or more merchants. For example, the funds transfer may be subject to a restriction based on time limit, amount limit, geographic limit, merchant type, merchant limit, and/or any combination thereof. In some examples, the funds transfer may include a plurality of portions. For example, a first portion of the funds transfer may be transmitted prior to a second portion of the funds transfer. Any portion of the funds transfer may be transmitted at a predetermined time, including but not limited to a day, time, week, month, and/or any combination thereof. In this manner, the funds transfer may be transmitted in aggregate until satisfaction of the entire funds transfer.

In other examples, the peer-to-peer transfer may comprise issuance of a virtual gift card. As with the issuance of credit, the virtual gift card may be subject to one or more spending restrictions and/or one or more merchants. For example, the virtual gift card may be subject to a time limit, amount limit, geographic limit, merchant type, merchant limit, and/or any combination thereof. In some examples, the peer-to-peer transfer may include a plurality of portions associated with various amounts of the virtual gift card. For example, a first portion of the peer-to-peer transfer may be transmitted prior to a second portion of the peer-to-peer transfer. Any portion of the transfer may be transmitted at a predetermined time, including but not limited to a day, time, week, month, and/or any combination thereof.

Figure 4:
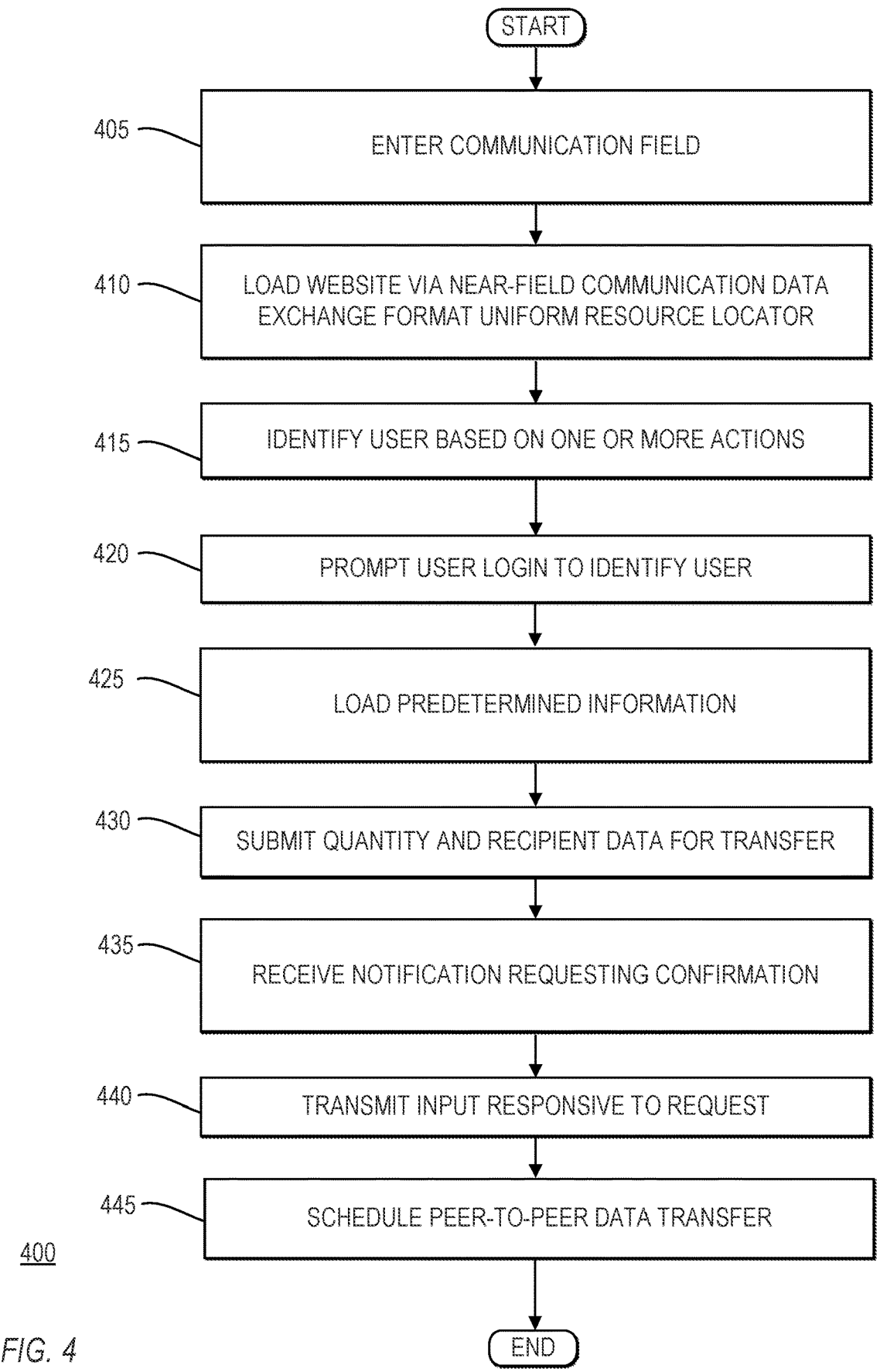
FIG. 4 depicts a method of initiating and authenticating data transfer according to an exemplary embodiment.

FIG. 4 depicts a method of initiating and authenticating data transfer according to an exemplary embodiment. FIG. 4 may reference the same or similar components of system 100, transmitting device 200 of FIG. 2A and FIG. 2B, and method 300 of FIG. 3. As illustrated in FIG. 4, a peer-to-peer transfer may be initiated by the card entering a communication field of a user device and loading a website.

At block 405, the method 400 may include the card entering a communication field of the user device, including but not limited to via one or more gestures selected from the group of a tap, swipe, wave, or any combination thereof. This communication may include but not be limited to NFC. At block 410, the method 400 may include loading a website via the NDEF URL to identify the user of the user device after the entry of the card into the communication field of the user device. In some examples, the card may be configured to transmit, after entering the communication field of block 405, a link to a client application of one or more user devices to initiate data transfer. In some examples, the transmittal of the link may occur after dynamically generating the link. In some examples, the client application may be associated with the issuing entity of the transmitting device or card. In other examples, the client application may not be associated with the issuing entity of the transmitting device or card. For example, the client application may be associated with a third party entity or an entity external to the issuing entity of the transmitting device or card.

In some examples, the NDEF URL may comprise a domain name and an identifier. For example, the link may include abstracted identification information, including but not limited to an account or user identifier for a cardholder, that is loaded onto the chip at the time of personalization of the card. For example, the URL may be encoded in a NDEF file at card embossing time. The abstracted identification information may be generated for each transaction, such as the dynamically generated URL. Without limitation, the identification information may be generated on the card by combining a unique identifier with one or more variables, such as a counter, one or more cryptographic algorithms, and/or any combination thereof. For example, the one or more cryptographic algorithms may include an encryption technique, such as public or private key encryption, that would also be known by a server for authentication. Without limitation, exemplary symmetric key algorithms may include symmetric key encryption such as DES, Triple DES, or AES. Without limitation, exemplary asymmetric key algorithms may include asymmetric public key encryption, digital signature algorithm, or RSA.

At block 415, the method 400 may include identifying the user via device fingerprinting, and may be based on, without limitation, at least one selected from the group of device configuration, device memory, device screen size, device operating system version, applications installed, phone carrier provider, third party cookies for websites, phone number tracking through MNO lookup, browser type, browser language, IP address, and/or any combination thereof of a device.

At block 420, the method may include prompting user login to identify the user if the website is unable to identify the user via cookies or device fingerprinting. For example, if the website cannot successfully identify the user via at least one selected from the group of operating system, browser type, browser language, IP address, the user may receive a notification, generated by the server, indicative of unsuccessful notification and/or may be prompted by the application to input login information in order to successfully identify the user and that is responsive to the unsuccessful notification.

At block 425, the method 400 may include loading predetermined information after identifying the user. In some examples, the predetermined information may be any information associated with the cardholder that is already filled out or otherwise provided on the website via being embedded directly in the NDEF URL. The website may be further configured to submit the transfer by selection of a button. Moreover, the website may be further configured to adjust recipient and/or transferor of the data transfer. For example, the directionality of the data transfer may be reversed. In some examples, by adjusting the directionality of the transfer, such as from transferor to recipient or from recipient to transferor, a corresponding message such as a push notification or email may be generated so as to indicate confirmation of the desired reversed directionality of the transfer. In some examples, the corresponding message may be displayed by the first application and/or second application.

At block 430, the method 400 may include entering quantity and recipient data for the peer-to-peer transfer prior to transfer submission. At block 435, the method 400 may include receiving an email or push notification to confirm the peer-to-peer transfer. For example, the cardholder may be associated with a user device. The application of user device may be configured to receive the notification. At block 440, responsive to receipt of the notification, the notification may be opened or displayed so as to prompt a log in or request biometric input to verify that the user initiated the transfer. In some examples, the prompt may include a request for one or more authentication inputs. For example, exemplary authentication inputs can include, without limitation, entry of login credentials, account information, security information, biometric information and a combination thereof (e.g., entry of a user name, a password, an account number, a security code, a one-time passcode, an answer to a security question, a fingerprint, a facial scan, a retinal scan, a voice recognition, and logging into an application or website associated with an account or card-issuing institution).

At block 445, after verification of the one or more authentication inputs, the peer-to-peer transfer between the cardholder and the second user may be scheduled. In some examples, the peer-to-peer transfer may be scheduled at a predetermined time, such as at a predetermined day, time, week, month, and/or year. In other examples, the peer-to-peer transfer may be scheduled instantly. In this manner, the peer-to-peer transfer may be scheduled or placed in queue for transaction without having to identify the person and downloading and signing up for different applications. In addition, the directionality of the data transfer may be reversed. In some examples, by adjusting the directionality of the transfer, such as from transferor to recipient or from recipient to transferor, a corresponding message such as a push notification or email may be generated so as to indicate confirmation of the desired reversed directionality of the transfer. In some examples, the corresponding message may be displayed by the first application and/or second application. In this manner, the peer-to-peer transfer would be for an authenticated user, after the confirmation, since the transfer is to a known recipient.

In some examples, the peer-to-peer transfer may comprise issuance of credit. The credit may be in accord with one or more spending restrictions. For example, the one or more spending restrictions may include a time limit, amount limit, geographic limit, merchant type, merchant limit, and/or any combination thereof. In some examples, the issuance of credit may be associated with one or more rewards and/or points. For example, the rewards and/or points may be issued and thereby added to a user reward or loyalty point program if the credit is used at a particular merchant, such as a restaurant, at a particular time, such as on the weekends. For example, the rewards and/or points may be adjusted for each of the transferor and the transferee, and may be adjusted based on redemption of the credit. For example, the rewards and/or points may be issued and thereby added to a user reward or loyalty point program if the credit is used at a particular merchant, such as a restaurant, and/or at a particular time, such as on the weekends. When the recipient or transferee uses the credit, the transferor may still accrue the rewards and/or points.

In other examples, the peer-to-peer transfer may comprise transfer of one or more digital assets. Without limitation, the digital asset may comprise an image or a document. Without limitation, the format type of the digital asset may include at least one selected from the group of a static image file (such as JPEG, PNG, SVG), a static document file (such as PDF, PSD), an animated file (such as GIF, SWF), and web code (such as HTML, CSS, JavaScript). The one or more digital assets may be identified for transfer. For example, the digital asset may be securely transmitted by launching a website and uploading the identified digital asset for transfer. In another example, the digital asset may be securely transmitted by opening an application or launching an email client in which the identified digital asset may be included as an attachment. In another example, the digital asset may be digital asset may be identified as part of a uniform resource locator (URL) that is transmitted for retrieving the identified digital asset.

In other examples, the peer-to-peer transfer may comprise a funds transfer, such as a cash transfer. As with the issuance of credit, the funds transfer may be subject to one or more spending restrictions and/or one or more merchants. For example, the funds transfer may be subject to a restriction based on time limit, amount limit, geographic limit, merchant type, merchant limit, and/or any combination thereof. In some examples, the funds transfer may include a plurality of portions. For example, a first portion of the funds transfer may be transmitted prior to a second portion of the funds transfer. Any portion of the funds transfer may be transmitted at a predetermined time, including but not limited to a day, time, week, month, and/or any combination thereof. In this manner, the funds transfer may be transmitted in aggregate until satisfaction of the entire funds transfer.

In other examples, the peer-to-peer transfer may comprise issuance of a virtual gift card. As with the issuance of credit, the virtual gift card may be subject to one or more spending restrictions and/or one or more merchants. For example, the virtual gift card may be subject to time limit, amount limit, geographic limit, merchant type, merchant limit, and/or any combination thereof. In some examples, the peer-to-peer transfer may include a plurality of portions associated with various amounts of the virtual gift card. For example, a first portion of the peer-to-peer transfer may be transmitted prior to a second portion of the peer-to-peer transfer. Any portion of the transfer may be transmitted at a predetermined time, including but not limited to a day, time, week, month, and/or any combination thereof.

Figure 5:
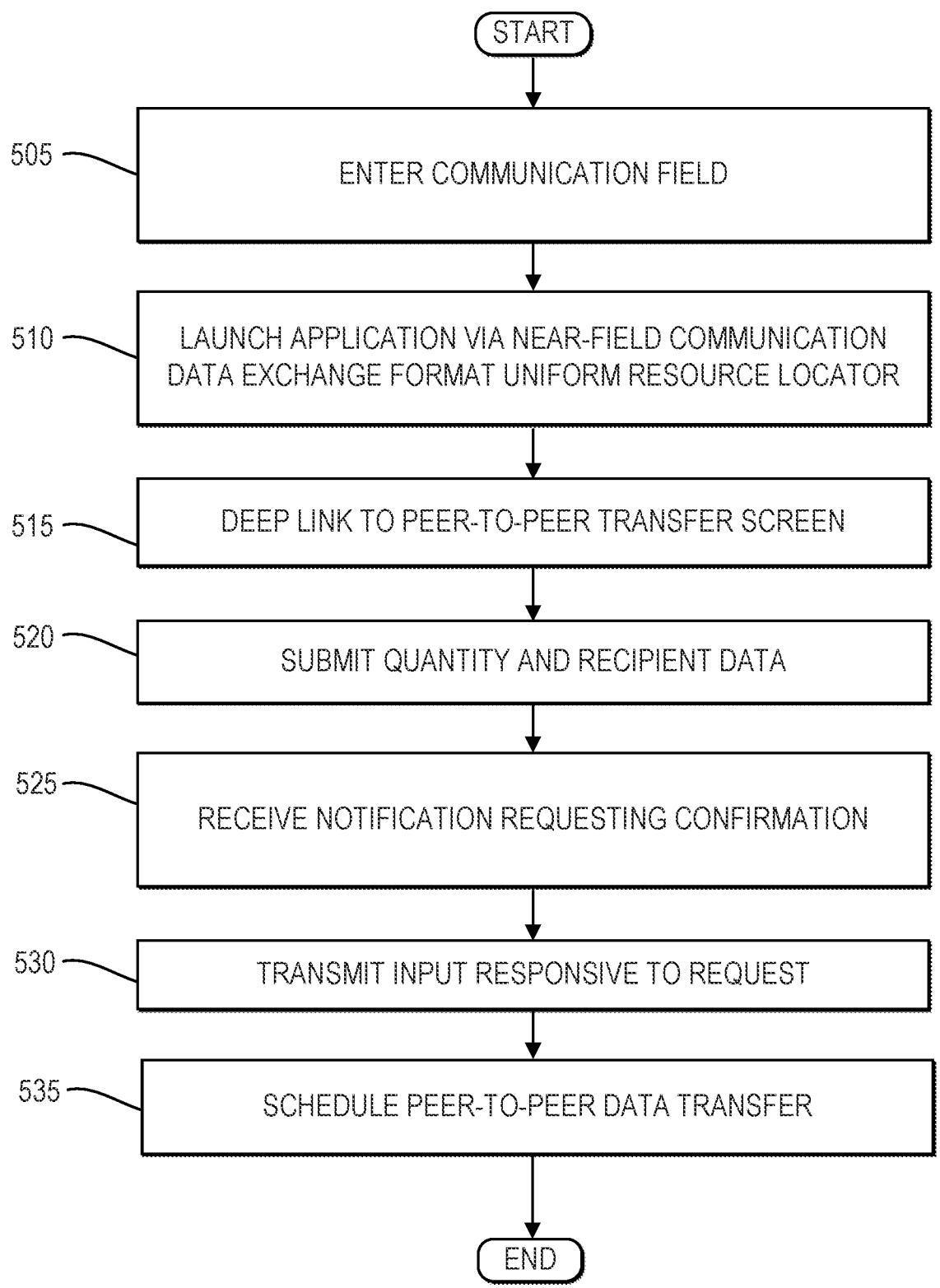
FIG. 5 depicts another method of initiating and authenticating data transfer according to an exemplary embodiment.

FIG. 5 depicts another method of initiating and authenticating data transfer according to an exemplary embodiment. FIG. 5 may reference the same or similar components of system 100, transmitting device 200 of FIG. 2A and FIG. 2B, method 300 of FIG. 3, and method 400 of FIG. 4. As illustrated in FIG. 5, a peer-to-peer transfer may be initiated by the card entering a communication field to a user device and deep linking into an application.

At block 505, the method may include the card entering a communication field of the user device, including but not limited to via one or more gestures selected from the group of a tap, swipe, wave, or any combination thereof. This communication may include but not be limited to near-field communication (NFC). At block 510, the method may include launching an application of a user device via the near field communication data exchange format (NDEF URL) after the entry of the card into the communication field of the user device. In some examples, the transmittal of the NDEF URL may occur after dynamically generating the NDEF URL. In some examples, the application may be associated with the issuing entity of the transmitting device. In other examples, the application may not be associated with the issuing entity of the transmitting device. For example, the application may be associated with a third party entity or an entity external to the issuing entity of the transmitting device. At block 515, the method may include deep linking by the application to a peer-to-peer transfer screen including predetermined information. In some examples, the predetermined information may be any information associated with the cardholder that is already filled out or otherwise via being embedded directly in the NDEF URL. In some examples, the application may be configured to, prior to deep linking, prompt the user to log in. In other examples, the application may be configured to, after deep linking, prompt the user to log in. In some examples, the log in, prior to deep linking, may be the same or different as the log in required after deep linking. Moreover, exemplary authentication inputs can include, without limitation, entry of login credentials, account information, security information, biometric information and a combination thereof (e.g., entry of a user name, a password, an account number, a security code, a one-time passcode, an answer to a security question, a fingerprint, a facial scan, a retinal scan, a voice recognition, and logging into an application or website associated with an account or card-issuing institution). At block 520, the method may include entering quantity and recipient data for the peer-to-peer transfer before the transfer is submitted. At block 525, the method may include receiving an email or push notification to confirm the peer-to-peer transfer. For example, the cardholder may be associated with a user device. The user device or its application may be configured to receive the notification. At block 530, responsive to receipt of the notification, the notification may be opened or displayed so as to prompt the authentication input to verify that the user initiated the transfer. At block 535, after verification, the peer-to-peer transfer between the cardholder and the second user may be scheduled. In some examples, the peer-to-peer transfer may be scheduled at a predetermined time, such as at a predetermined day, time, week, month, and/or year. In other examples, the peer-to-peer transfer may be scheduled instantly. In this manner, the peer-to-peer transfer may be scheduled or placed in queue for transaction without having to identify the person and downloading and signing up for different applications. In addition, the directionality of the data transfer may be reversed. In some examples, by adjusting the directionality of the transfer, such as from transferor to recipient or from recipient to transferor, a corresponding message such as a push notification or email may be generated so as to indicate confirmation of the desired reversed directionality of the transfer. In some examples, the corresponding message may be displayed by the first application and/or second application. In this manner, the peer-to-peer transfer would be for an authenticated user, after the confirmation, since the transfer is to a known recipient.

In some examples, the peer-to-peer transfer may comprise issuance of credit. The credit may be in accord with one or more spending restrictions. For example, the one or more spending restrictions may include a time limit, amount limit, geographic limit, merchant type, merchant limit, and/or any combination thereof. In some examples, the issuance of credit may be associated with one or more rewards and/or points. For example, the rewards and/or points may be issued and thereby added to a user reward or loyalty point program if the credit is used at a particular merchant, such as a restaurant, at a particular time, such as on the weekends. For example, the rewards and/or points may be adjusted for each of the transferor and the transferee, and may be adjusted based on redemption of the credit. For example, the rewards and/or points may be issued and thereby added to a user reward or loyalty point program if the credit is used at a particular merchant, such as a restaurant, and/or at a particular time, such as on the weekends. When the recipient or transferee uses the credit, the transferor may still accrue the rewards and/or points.

In other examples, the peer-to-peer transfer may comprise transfer of one or more digital assets. Without limitation, the digital asset may comprise an image or a document. Without limitation, the format type of the digital asset may include at least one selected from the group of a static image file (such as JPEG, PNG, SVG), a static document file (such as PDF, PSD), an animated file (such as GIF, SWF), and web code (such as HTML, CSS, JavaScript). The one or more digital assets may be identified for transfer. For example, the digital asset may be securely transmitted by launching a website and uploading the identified digital asset for transfer. In another example, the digital asset may be securely transmitted by opening an application or launching an email client in which the identified digital asset may be included as an attachment. In another example, the digital asset may be digital asset may be identified as part of a uniform resource locator (URL) that is transmitted for retrieving the identified digital asset.

In other examples, the peer-to-peer transfer may comprise a funds transfer, such as a cash transfer. As with the issuance of credit, the funds transfer may be subject to one or more spending restrictions and/or one or more merchants. For example, the funds transfer may be subject to a restriction based on time limit, amount limit, geographic limit, merchant type, merchant limit, and/or any combination thereof. In some examples, the funds transfer may include a plurality of portions. For example, a first portion of the funds transfer may be transmitted prior to a second portion of the funds transfer. Any portion of the funds transfer may be transmitted at a predetermined time, including but not limited to a day, time, week, month, and/or any combination thereof. In this manner, the funds transfer may be transmitted in aggregate until satisfaction of the entire funds transfer.

In other examples, the peer-to-peer transfer may comprise issuance of a virtual gift card. As with the issuance of credit, the virtual gift card may be subject to one or more spending restrictions and/or one or more merchants. For example, the virtual gift card may be subject to time limit, amount limit, geographic limit, merchant type, merchant limit, and/or any combination thereof. In some examples, the peer-to-peer transfer may include a plurality of portions associated with various amounts of the virtual gift card. For example, a first portion of the peer-to-peer transfer may be transmitted prior to a second portion of the peer-to-peer transfer. Any portion of the transfer may be transmitted at a predetermined time, including but not limited to a day, time, week, month, and/or any combination thereof.

In this specification, reference is made to types of resource locators, such as a URL, NDEF URL, IRL, URI, and URN. However, it is understood that these references are exemplary, and the present disclosure includes, but is not limited to, the types of resource locators mentioned.

It is further noted that the systems and methods described herein may be tangibly embodied in one of more physical media, such as, but not limited to, a compact disc (CD), a digital versatile disc (DVD), a floppy disk, a hard drive, read only memory (ROM), random access memory (RAM), as well as other physical media capable of data storage. For example, data storage may include random access memory (RAM) and read only memory (ROM), which may be configured to access and store data and information and computer program instructions. Data storage may also include storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, any type of tangible and non-transitory storage medium), where the files that comprise an operating system, application programs including, for example, web browser application, email application and/or other applications, and data files may be stored. The data storage of the network-enabled computer systems may include electronic information, files, and documents stored in various ways, including, for example, a flat file, indexed file, hierarchical database, relational database, such as a database created and maintained with software from, for example, Oracle® Corporation, Microsoft® Excel file, Microsoft® Access file, a solid state storage device, which may include a flash array, a hybrid array, or a server-side product, enterprise storage, which may include online or cloud storage, or any other storage mechanism. Moreover, the figures illustrate various components (e.g., servers, computers, processors, etc.) separately. The functions described as being performed at various components may be performed at other components, and the various components may be combined or separated. Other modifications also may be made.

In the preceding specification, various embodiments have been described with references to the accompanying drawings. It will, however, be evident that various modifications and changes may be made thereto, and additional embodiments may be implemented, without departing from the broader scope of the invention as set forth in the claims that follow. The specification and drawings are accordingly to be regarded as an illustrative rather than restrictive sense.

We claim:

1. An authenticated peer-to-peer data transfer system comprising: a contactless card associated with a cardholder, comprising a processor and a memory, wherein the processor is configured to: dynamically generate a unique near field communication data exchange format uniform resource locator (NDEF URL) after the contactless card enters a communication field associated with a communication device of a recipient user distinct from the cardholder, the URL being operative to launch a website on the communication device, the website being operative to initiate and authenticate a peer-to-peer data transfer between the recipient user and the cardholder, wherein the URL comprises: a first set of information including abstracted identifier information generated, on the card, by combining a unique identifier with one or more variables, the one or more variables comprising a counter, wherein the unique identifier, and the one more variables are stored on the contactless card, and a second set of information including information associated with the cardholder loaded on to the contactless card at the time of personalization of the card; transmit the dynamically generated NOES URL, via near field communication (NEC) to the communication device, to initiate a data transfer associated with a third set of information, entered into the dynamically generated website based on one or more inputs provided by the recipient user; initiate the data transfer responsive to a confirmation of the third set of information via an authenticated response from the cardholder.

2. The authenticated peer-to-peer data transfer system of claim 1, wherein one or more actions, based on the NDEF URL, are configured to identify a user.

3. The peer-to-peer authenticated data transfer system of claim 2, wherein at least one action from the one or more actions comprises launching a website configured to initiate the data transfer upon receiving one or more valid authentication inputs from the communication device associated with the recipient user and an authenticated confirmation from a computing device associated with the cardholder.

4. The peer-to-peer authenticated data transfer system of claim 3, wherein the recipient user associated with the communication device is identified by at least one selected from the group of device fingerprinting and a cookie.

5. The authenticated peer-to-peer data transfer system of claim 4, wherein login information is requested upon determination of an unsuccessful identification.

6. The peer-to-peer authenticated data transfer system of claim 4, wherein the website is configured to display the second set of information and the third set of information.

7. The peer-to-peer authenticated data transfer system of claim 6, wherein the authenticated confirmation from the computing device associated with the cardholder comprises one or more responses associated with confirmation of the third set of information.

8. The peer-to-peer authenticated data transfer system of claim 7, wherein one or more authentication communications associated with confirmation of the third set of information are performed, the one or more authentication communications including at least one selected from the group of biometric communication and login communication.

9. The peer-to-peer authenticated data transfer system of claim 1, wherein the first set of information further includes an abstracted user name generated by the processor after entry of the contactless card into the communication field.

10. The peer-to-peer authenticated data transfer system of claim 3, wherein the communication device comprises at least one selected from the group of a mobile device, a wearable device, and a kiosk.

11. The peer-to-peer authenticated data transfer system of claim 2, wherein at least one action from the one or more actions comprises requesting one or more login credentials.

12. The peer-to-peer authenticated data transfer system of claim 11, wherein a deep link to a screen including the second set of information and the third set of information is provided upon validation of one or more authentications inputs from the recipient user and the cardholder.

13. The peer-to-peer authenticated data transfer system of claim 1, wherein the third set of information includes at least one selected from the group of a quantity, digital asset, and recipient information.

14. The peer-to-peer authenticated data transfer system of claim 13, wherein a notification comprises the one or more responses associated with confirmation of the third set of information.

15. The peer-to-peer authenticated data transfer system of claim 1, wherein the data transfer is scheduled at a predetermined time.

16. A method of authenticating a peer-to-peer data transfer, comprising:
   storing, on a contactless card comprising a memory and a processor memory, a unique identifier, one or more account and identity information associated with a cardholder, and one or more cryptographic algorithm;
   dynamically generating, after entry of the processors of the contactless card into a communication field of a first device associated with a recipient, a link, the link comprising a near field communication data exchange format uniform resource locator (NDEF URL) including abstracted identifier information and the one or more account and identity information associated with the cardholder, wherein the abstracted identifier information is generated using the unique identifier and the cryptographic algorithm;
   transmitting via near filed communication (NFC), to a first application comprising instructions for execution on the first device, the link to initiate a data transfer, associated with the third set of information, wherein the third set of information is entered into a website via one or more inputs provided by the recipient via the first device, the website being launch, on the first device, in response to the link received from the contactless card and displaying one or more account and identity information associated with the cardholder;
   authenticating a user associated with the first device by activating one or more actions based on the link;
   transmitting, to a computing device associated with the cardholder, one or more requests for confirmation of the third set of information provided by the recipient via the website launched on the first device, wherein the computing device and the first device are distinct devices operated by distinct users;
   receiving one or more notifications that are based on the one or more requests for confirmation of the third set of information associated with the data transfer; and
   performing one or more login credentials that are responsive to the one or more notifications so as to complete the peer-to-peer data transfer.

17. The method of claim 16, wherein at least one action from the one or more actions comprises requesting one or more login credentials.

18. A computer readable non-transitory medium comprising computer-executable instructions that, when executed by a processor, perform procedures comprising the steps of:
   dynamically generating, after entry of a contactless card into a communication field, a link, the link comprising a first set of information and a second set of information, the first set of information including abstracted identifier information generated by the contactless card using an identifier and a cryptographic algorithm stored on the contactless card, the second set of information including cardholder information loaded on to the contactless card at the time of personalization of the card;
   transmitting, to a first application comprising instructions for execution on a first device, the link to initiate a data transfer associated with a third data set entered into the dynamically generated website based on one or more inputs provided by the recipient user;
   identifying a user associated with the first device by activating one or more actions based on the link, the one or more actions configured to request confirmation of the third set of information associated with the data transfer; and
   transmitting one or more responses based on authentication of the third set of information so as to complete the peer-to-peer data transfer between the ser of the first device and the cardholder.

19. The method of claim 16, wherein the third set of information includes at least one selected from the group of a quantity, digital asset, and information associated with the recipient.

20. The method of claim 16, wherein the cardholder associated with the computing device is authenticated by at least one selected from the group of device fingerprinting and a cookie.

* * * * *